(12) United States Patent
Boucher et al.

(10) Patent No.: US 7,961,552 B2
(45) Date of Patent: Jun. 14, 2011

(54) FAN BEAM TRANSDUCER ASSEMBLY

(75) Inventors: Stephen G. Boucher, Amherst, NH (US); Robert M. Cullen, Temple, NH (US)

(73) Assignee: Airmar Technology Corporation, Milford, NH (US)

( * ) Notice: Subject to any disclaimer, the term of this patent is extended or adjusted under 35 U.S.C. 154(b) by 384 days.

(21) Appl. No.: 12/231,054

(22) Filed: Aug. 28, 2008

(65) Prior Publication Data
US 2010/0054084 A1 Mar. 4, 2010

(51) Int. Cl.
G01S 3/80 (2006.01)
(52) U.S. Cl. ......................................... 367/173
(58) Field of Classification Search .................. 367/173, 367/140, 138, 88, 111
See application file for complete search history.

(56) References Cited

U.S. PATENT DOCUMENTS

| | | | |
|---|---|---|---|
| 2,671,206 A | 3/1954 | Krause | |
| 2,837,727 A | 6/1958 | Mayes | |
| 3,553,638 A | 1/1971 | Sublett | |
| 3,752,431 A | 8/1973 | McBride | |
| 3,753,219 A | 8/1973 | King, Jr. | |
| 3,880,106 A | 4/1975 | Farmer | |
| 3,907,239 A | 9/1975 | Ehrlich | |
| 3,989,213 A | 11/1976 | Allen | |
| 3,989,216 A | 11/1976 | Veatch | |
| 4,052,693 A | 10/1977 | Gilmour | |
| 4,144,518 A | 3/1979 | Minohara et al. | |
| 4,207,620 A | 6/1980 | Morgera | |
| 4,282,590 A | 8/1981 | Wingate | |
| 4,479,206 A | 10/1984 | Granberg et al. | |
| 4,737,940 A | 4/1988 | Arringotn | |
| 4,815,048 A | 3/1989 | Boucher et al. | |
| 4,926,399 A | 5/1990 | Hickman | |
| 4,928,915 A | 5/1990 | Havins | |
| 4,970,700 A * | 11/1990 | Gilmour et al. | 367/88 |
| 4,979,153 A | 12/1990 | Terry | |
| 4,980,872 A | 12/1990 | Oler et al. | |
| 4,982,924 A | 1/1991 | Havins | |
| 4,995,010 A | 2/1991 | Knight | |
| 5,016,225 A | 5/1991 | Blomberg | |
| 5,025,423 A * | 6/1991 | Earp | 367/137 |
| 5,142,497 A | 8/1992 | Warrow | |
| 5,182,732 A | 1/1993 | Pichowkin | |

(Continued)

OTHER PUBLICATIONS

"Digital Scientific Echosounder", http://www.biosonicsinc.com/docs/hardware-specifications.pdf. At least by Jul. 7, 2008.

(Continued)

*Primary Examiner* — Dan Pihulic
(74) *Attorney, Agent, or Firm* — Hamilton, Brook, Smith & Reynolds, P.C.

(57) ABSTRACT

A transducer assembly including a fan beam transducer having a beam generation axis for generating a fan shaped acoustic beam along the beam generation axis. The fan shaped acoustic beam can have a generally elliptical cross sectional shape with a major axis and a minor axis across a plane generally perpendicular to the beam generation axis. The transducer can be housed in a housing and have a direction of travel axis. The fan shaped acoustic beam can be rotatable relative to the direction of travel axis. The housing can have a release locking arrangement for rotationally releasing and locking the position of the fan shaped acoustic beam for orienting at least one of the major axis and minor axis of the fan shaped acoustic beam at a desired position relative to the direction of travel axis.

46 Claims, 21 Drawing Sheets

U.S. PATENT DOCUMENTS

| | | | |
|---|---|---|---|
| 5,186,050 A | | 2/1993 | Lagace et al. |
| 5,327,398 A | | 7/1994 | Wansley et al. |
| 5,515,340 A | | 5/1996 | Kim et al. |
| 5,526,765 A | | 6/1996 | Ahearn |
| 5,573,221 A | | 11/1996 | Reeves |
| 5,577,006 A | * | 11/1996 | Kuc .............................. 367/103 |
| 5,675,552 A | | 10/1997 | Hicks et al. |
| 6,094,402 A | | 7/2000 | Cooper et al. |
| 6,160,764 A | | 12/2000 | Powell |
| 6,201,767 B1 | * | 3/2001 | Lagace et al. ................. 367/173 |
| 6,377,516 B1 | | 4/2002 | Whiteside et al. |
| 6,421,299 B1 | | 7/2002 | Betts et al. |
| 6,490,229 B1 | | 12/2002 | Caver |
| 6,652,331 B2 | | 11/2003 | Healey |
| 6,661,742 B2 | | 12/2003 | Hansen |
| 6,791,902 B1 | | 9/2004 | Steiner et al. |
| 6,899,574 B1 | | 5/2005 | Kalis et al. |
| 6,904,798 B2 | | 6/2005 | Boucher et al. |
| 7,036,451 B1 | | 5/2006 | Hutchinson |
| 7,230,882 B2 | | 6/2007 | Swisher |
| 7,327,636 B2 | | 2/2008 | Nishimori et al. |
| 7,369,459 B2 | | 5/2008 | Kawabata et al. |
| 2006/0236770 A1 | | 10/2006 | Nishimori et al. |
| 2008/0025149 A1 | | 1/2008 | Snyder |
| 2008/0068926 A1 | | 3/2008 | Chambers et al. |
| 2010/0054084 A1 | * | 3/2010 | Boucher et al. ............... 367/118 |

OTHER PUBLICATIONS

"Model 540 Split-Beam Transducers", http://www.htisonar.com/transducers.htm. At least by Jul. 7, 2008.

"Thru-Hull—Professional Series Bronze Stem", http://www.airmartechnology.com/uploads/catalogPages/cat_81.pdf. Mar. 2004.

"Transducers—Simrad", http://www.echomastermarine.co.uk/transducers/manufacturer/Simrad.html. At least by Jul. 7, 2008.

"B258 Professional Series Temp/Depth Transducer", http://www.defender.com/product.jsp?path=-1| 344| 69977| 320684| 699997| 781123&id=| 1006640| At least by Jul. 7, 2008.

"SS270W Twin Wide-Beam Preliminary", Airmar Technology Corporation, Oct. 24, 2007.

Naoi, Jun, et al., "Sea Trial Results of a Cross Fan Beam Type Sub-Bottom Profiler", *Japanese Journal of Applied Physics*, vol. 39, The Japan Society of Applied Physics, http://jjap.ipap.jp/link?JJAP/39/3209/5/15/2008, 2000.

* cited by examiner

FAN BEAM TRANSDUCER ASSEMBLY

BACKGROUND

Typically fish finding devices employ an acoustic transducer that generates a conical acoustic beam directed downwardly into the water for locating fish. Fan beam transducers that generate a fan or elliptical shaped beam are often used for bottom finding or surveying, and fish finding. However, beam orientation has typically been fixed, which has limited their utility and versatility in fish finding applications.

SUMMARY

The present invention can provide a transducer assembly including a fan beam transducer that is suitable for fish finding. The fan beam transducer has a beam generation axis, and can generate a fan shaped acoustic beam along the beam generation axis. The fan shaped acoustic beam can have a generally elliptical cross sectional shape with a major axis and a minor axis across a plane generally perpendicular to the beam generation axis. The transducer can be housed in a housing, and have a direction of travel axis. The fan shaped acoustic beam can be rotatable relative to the direction of travel axis. The housing can have a release locking arrangement for rotationally releasing and locking the position of the fan shaped acoustic beam for orienting at least one of the major axis and minor axis of the fan shaped acoustic beam at a desired position relative to the direction of travel axis.

In particular embodiments, the transducer can be rotatable within the housing about the beam generation axis. The locking arrangement can be a quick release locking arrangement and can include a locking member resiliently biased relative to the transducer for releasably locking the transducer. The transducer can be resiliently biased upwardly against the locking member by a resilient biasing member, and can be resiliently moved downwardly by a hand to disengage from the locking member for allowing rotation. Release of the transducer by the hand allows the resilient biasing member to bias and re-engage the transducer with the locking member in the desired position relative to the direction of travel axis. The transducer and the locking member each can have a locking structure which interlock with each other. At least one of the locking structures of the transducer and the locking member can have protrusions, and the other recesses, which interlock for locking the transducer in the desired position. The locking structures of the transducer and the locking member can be positioned in a circular pattern relative to the beam generation axis. The locking structure of the locking member can be positioned above the locking structure of the transducer, and the locking structure of the transducer can be spring loaded against the locking structure of the locking member by an annular spring, which can be a wave spring washer. The locking member can have a central opening through which an upper region of the transducer can be seen. The upper region of the transducer can have an indicator of position of the major axis of the fan shaped acoustic beam. The major axis of the fan shaped acoustic beam can be locked in line with the direction of travel axis, 90° to the direction of travel axis, and in some situations, at an acute angle relative to the direction of travel axis. The locking member can have fixed predetermined locking positions for orienting angular position of the major axis of the fan shaped acoustic beam, and the assembly can include angle alignment markings for alignment with the major axis of the fan shaped acoustic beam. In one embodiment, the transducer assembly can have a mounting bracket for mounting to a watercraft. In another embodiment, the transducer assembly can have an adjustable mounting band for mounting to a trolling motor. In other embodiments, the fan beam transducer can include a transducer element and a mask member or acoustic baffle for generating the fan shaped acoustic beam. The mask member can be rotatable relative to the transducer element for rotationally changing the position of the fan shaped acoustic beam.

The present invention can also provide a transducer assembly including a fan beam transducer having a beam generation axis, for generating a fan shaped acoustic beam along the beam generation axis. The fan shaped acoustic beam can have a generally elliptical cross sectional shape with a major axis and a minor axis across a plane generally perpendicular to the beam generation axis. The transducer can be housed in a housing having a direction of travel axis. The transducer can be oriented for generating the fan shaped acoustic beam generally vertically downwardly into the water with the major axis at an acute angle relative to the direction of travel axis, such that the fan shaped acoustic beam has a relative width and length with respect to the direction of travel axis that is greater than a distance across the fan shaped acoustic beam along the minor axis.

In particular embodiments, the housing can include an adjustment mechanism capable of locking the fan beam transducer at a series of predetermined angles. The major axis of the fan shaped acoustic beam can be positioned relative to the direction of travel axis at an angle in the range of about 20° to 50°.

The present invention can also provide a method of operating a transducer assembly which has a fan beam transducer with a beam generation axis, for generating a fan shaped acoustic beam along the beam generation axis. The fan shaped acoustic beam can have a generally elliptical cross sectional shape with a major axis and a minor axis across a plane generally perpendicular to the beam generation axis. The transducer can be housed within a housing, and have a direction of travel axis. The fan shaped acoustic beam can be rotatable relative to the direction of travel axis. The position of the fan shaped acoustic beam can be rotationally released and locked with a release locking arrangement for orienting at least one of the major axis and minor axis of the fan shaped acoustic beam at a desired position relative to the direction of travel axis.

In particular embodiments, the transducer can be rotated within the housing about the beam generation axis. The transducer can be released and locked with a quick release locking arrangement. A locking member can be resiliently biased relative to the transducer for releasably locking the transducer. The transducer can be resiliently biased upwardly against the locking member with the resilient biasing member, and can be resiliently movable downwardly by a hand to disengage from the locking member for allowing rotation. Release of the transducer by the hand can allow the resilient biasing member to bias and re-engage the transducer with the locking member in the desired position relative to the direction of travel axis. The transducer and the locking member can each have a locking structure which interlock with each other. At least one of the locking structures of the transducer and the locking member can have protrusions, and the other recesses, which interlock for locking the transducer in the desired position. The locking structures of the transducer and the locking member can be positioned in a circular pattern relative to the beam generation axis. The locking structure of the locking member can be positioned above the locking structure of the transducer, and the locking structure of the transducer can be spring loaded against the locking structure of the locking member with an annular spring, which can be a wave spring washer. The locking member can have a central opening through which an upper region of the transducer can be seen. An indicator of position of the major axis of the fan shaped acoustic beam can be on the upper region of the transducer for determining the desired position. The major axis of the fan shaped acoustic beam can be locked in line with the direction of travel axis, 90° to the direction of travel axis, and in some situations, at an acute angle relative to the direction of travel axis. Fixed predetermined locking positions on the locking member can be employed for orienting angular position of the major axis of the fan shaped acoustic beam, and angle alignment markings on the assembly can be aligned with the major axis of the fan shaped acoustic beam. In one embodiment, the transducer assembly can be mounted to a watercraft with a mounting bracket. In another embodiment, the transducer assembly can be mounted to a trolling motor with an adjustable mounting band. In other embodiments, the fan shaped acoustic beam can be generated with a transducer element and a mask member or acoustic baffle. The mask member can be rotatable relative to the transducer element for rotationally changing the position of the fan shaped acoustic beam.

The present invention can also provide a method of detecting fish in water, including moving a water craft relative to the water along a direction of travel axis. A fan beam transducer can be mounted to the watercraft, and can have a beam generation axis. A fan shaped acoustic beam can be generated along the beam generation axis with the transducer. The fan shaped acoustic beam can have a generally elliptical cross sectional shape with a major axis and a minor axis across a plane generally perpendicular to the beam generation axis. The fan shaped acoustic beam can be directed generally vertically downwardly into the water with the major axis at an acute angle relative to the direction of travel axis, such that the fan shaped acoustic beam has a relative width and length with respect to the direction of travel axis that is greater than a distance across the fan shaped acoustic beam along the minor axis.

In particular embodiments, the fan beam transducer can be housed in a housing having an adjustment mechanism capable of locking the fan beam transducer at a series of predetermined angles. The fan beam transducer can be operated with the major axis of the fan shaped acoustic beam being positioned relative to the direction of travel axis at an angle in the range of about 20° to 50°.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
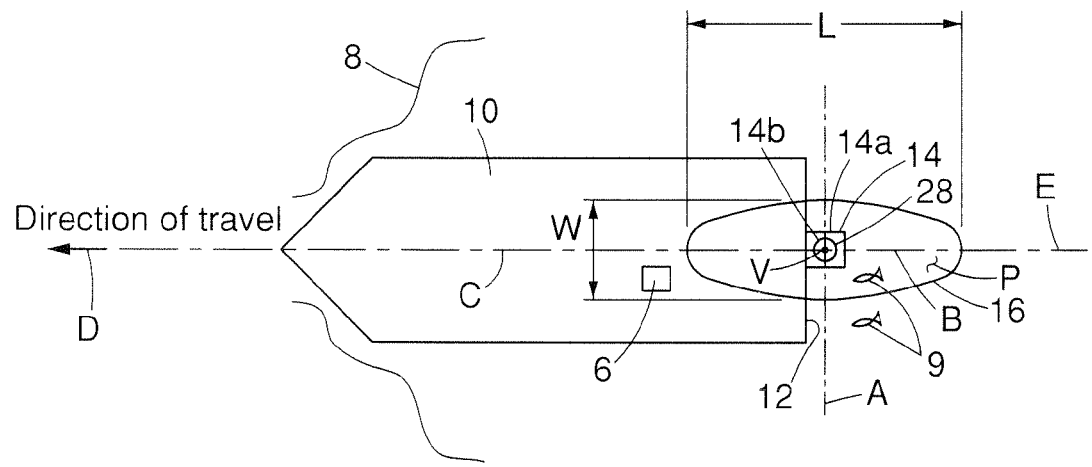
FIGS. 1-3 are schematic drawings of a watercraft employing a fan or elliptical shaped acoustic beam on the transom, with the major axis of the beam oriented along the direction of travel, at 90°, and at an acute angle in accordance with embodiments of the present invention.
Figure 2:
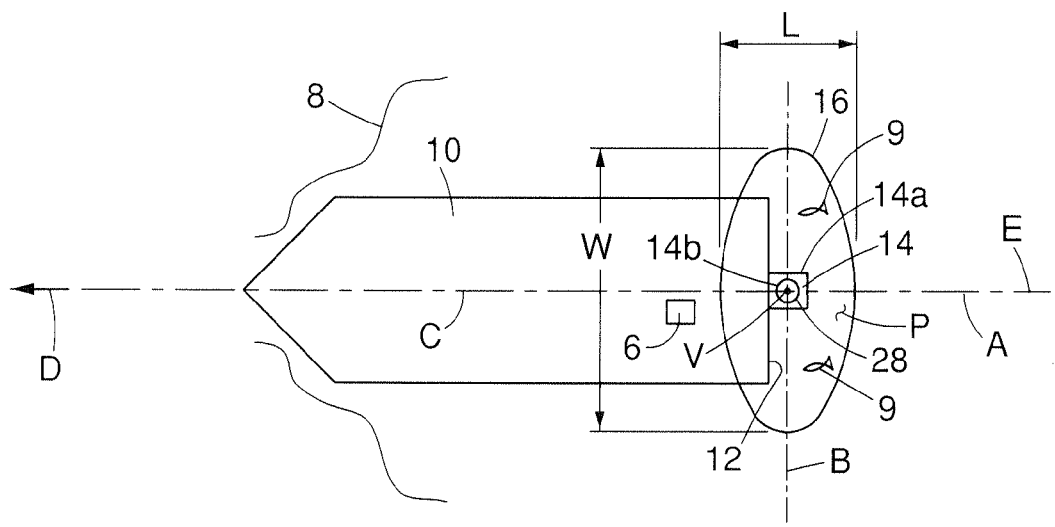

Referring to FIGS. 1 and 2, a watercraft 10, for example, a ship or boat, can include a fan beam transducer assembly 14 mounted to the back, rear, stern or transom 12. The transducer assembly 14 can have housing 14a with a housing axis E aligned with the direction of travel axis D of the watercraft 10, and contain an acoustic transducer generator device 28 with a vertical or beam generation axis V for generating a fan or elliptical shaped acoustic transducer beam 16, typically generally vertically downwardly into the water 8 for finding targets, for example, fish 9. The cross sectional shape of the beam 16 is shown schematically for illustration purposes, and it is understood that the actual shape of the beam 16 can differ. The beam 16 can be directed generally vertically downwardly into the water 8 and typically has a generally elliptical cross section with a minor axis A and a major axis B, taken across or along a plane P that is generally horizontal, perpendicular or at a right angle relative to the vertical axis V. Referring to FIG. 1, the transducer assembly 14 can orient the transducer 28 such that the major axis B of the fan shaped beam 16 is positioned along or inline with the direction of travel axis D or housing axis E. The fan beam transducer assembly 14 is shown positioned along the longitudinal axis C of the watercraft 10, but it is understood that often, the assembly 14 is positioned offset from axis C, while still being considered along the direction of travel axis D. Fish 9 can be detected within the width W and length L of the fan shaped beam 16 relative to the direction of travel axis D, housing axis E or watercraft 10, as the watercraft 10 moves relative to the water 8. With the major axis B of the fan shaped beam 16 being positioned in the direction of travel axis D or housing axis E, the beam 16 has a long length L and the fish 9 detected within the fan shaped beam 16 can remain in the beam 16 for a long enough time to appear on a time vs. depth graphical display 6 as an arched shaped signature, which can allow the user to determine that the target is a fish, and have an idea of the relative size. In addition, this orientation can be used for bottom discrimination.

The transducer assembly 14 can have a quick release adjustment/locking arrangement or feature 14b for rotationally changing the orientation of transducer 28 and the fan shaped beam 16 about vertical axis V. For example, the major axis B of the fan shaped beam 16 can be fixed or secured at 90° or perpendicular to the longitudinal axis C of the watercraft 10, the direction of travel axis D or housing axis E, laterally or on plane P, as seen in FIG. 2. Such an orientation increases the width W of the beam 16 relative to the direction of travel axis D, housing axis E or watercraft 10, while the watercraft 10 is traveling along the direction of travel axis D. This can detect fish 9 that are outside the width W provided by the orientation of FIG. 1 and undetectable in that orientation. However, the length L of the beam 16 relative to the direction of travel axis D or housing axis E is shortened such that the fish 9 are not within the beam 16 for a significant length of the time and can appear on the display 6 only as short straight lines and for a shorter period of time. If the targets are already known to be fish 9, the orientation of FIG. 2 can be useful in finding fish 9 over a wider width W relative to the direction of travel axis D.

Figure 3:
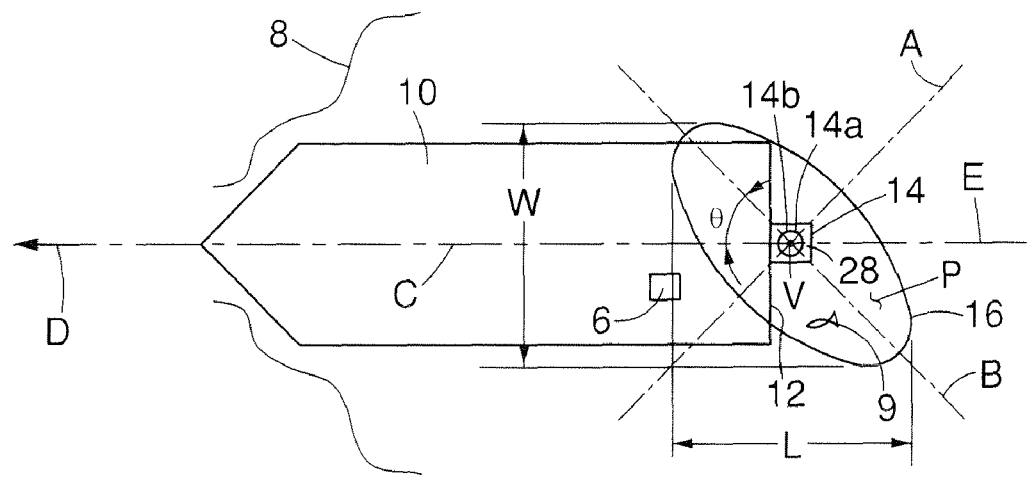

Referring to FIG. 3, the quick release adjustment/locking feature 14b of transducer assembly 14 can also orient the transducer 28 into a fixed position where the major axis B is at an acute angle θ relative to the longitudinal axis C of the watercraft 10, the direction of travel axis D, or housing axis E, laterally or on plane P. At such an orientation, the fan shaped acoustic beam 16 has a width W and length L relative to the direction of travel axis D, housing axis E or watercraft 10, that are both greater than the distance across the cross section of the beam 16 along the minor axis A. As a result, the width W of the beam 16 relative to the direction of travel axis D or housing axis E is greater than in the orientation of FIG. 1, and the length L of the beam 16 is greater than in the orientation of FIG. 2, resulting in a width W and length L that are intermediate or a composite of those obtained in the orientations of FIGS. 1 and 2. In FIG. 3, the length L of beam 16 is schematically shown as the total length in the direction of travel, which can be an approximation across much of the width W, but it is understood the actual length L of the beam 16 relative to the target or fish 9 can vary depending upon the actual shape of the beam 16 and the portion or location of the beam 16 that of the fish 9 passes through. Typically, when the watercraft 10 is moving forward as shown, with the major axis B at an acute angle θ, fish 9 can be detected at a greater width W than obtained in the orientation of FIG. 1, can appear on the display 6 for a longer period of time than obtained in the orientation of FIG. 2, and can have an arched shaped and larger signature. The width W and length L of beam 16 can be adjusted by adjusting the orientation of the transducer 28 to adjust the angle θ of the major axis B of the beam relative to the longitudinal axis C, the direction of travel axis D or housing axis E. In FIG. 3, the beam 16 is shown angled to one side at an angle of 45°, and it is understood that the angle θ can be different, or that the beam 16 can be angled from the opposite side. Usually, the longitudinal axis C of the watercraft 10, the direction of travel axis D and housing axis E are in the same direction or parallel when the watercraft 10 is moving forward but in some instances, this can be varied.

Figure 4:
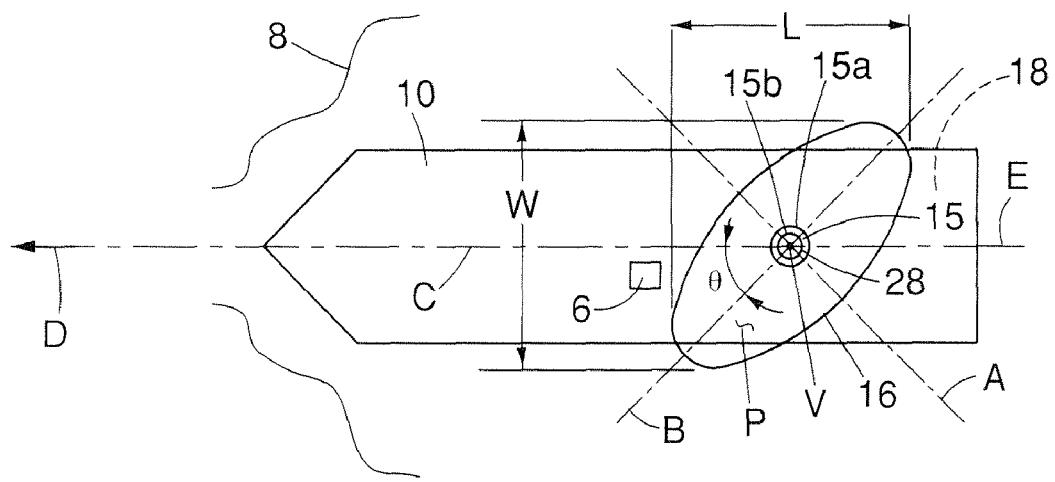
FIG. 4 is a schematic drawing of a watercraft employing a fan shaped beam in a through hull transducer housing in accordance with embodiments of the present invention.

Referring to FIG. 4, an adjustable through hull transducer assembly 15 can be mounted to the hull 18 of the watercraft 10 and can have an adjustable housing 15a with a quick release adjustment/locking arrangement or feature 15b similar to that discussed with regard to FIGS. 1-3, for adjusting the orientation of the transducer 28 and beam 16. Adjustment/locking features discussed below can also be employed. The transducer 28 can be operated at an angle to obtain detection of fish 9 over a greater width W than obtained in FIG. 1 and with a suitable signature on the display.

Figure 5:
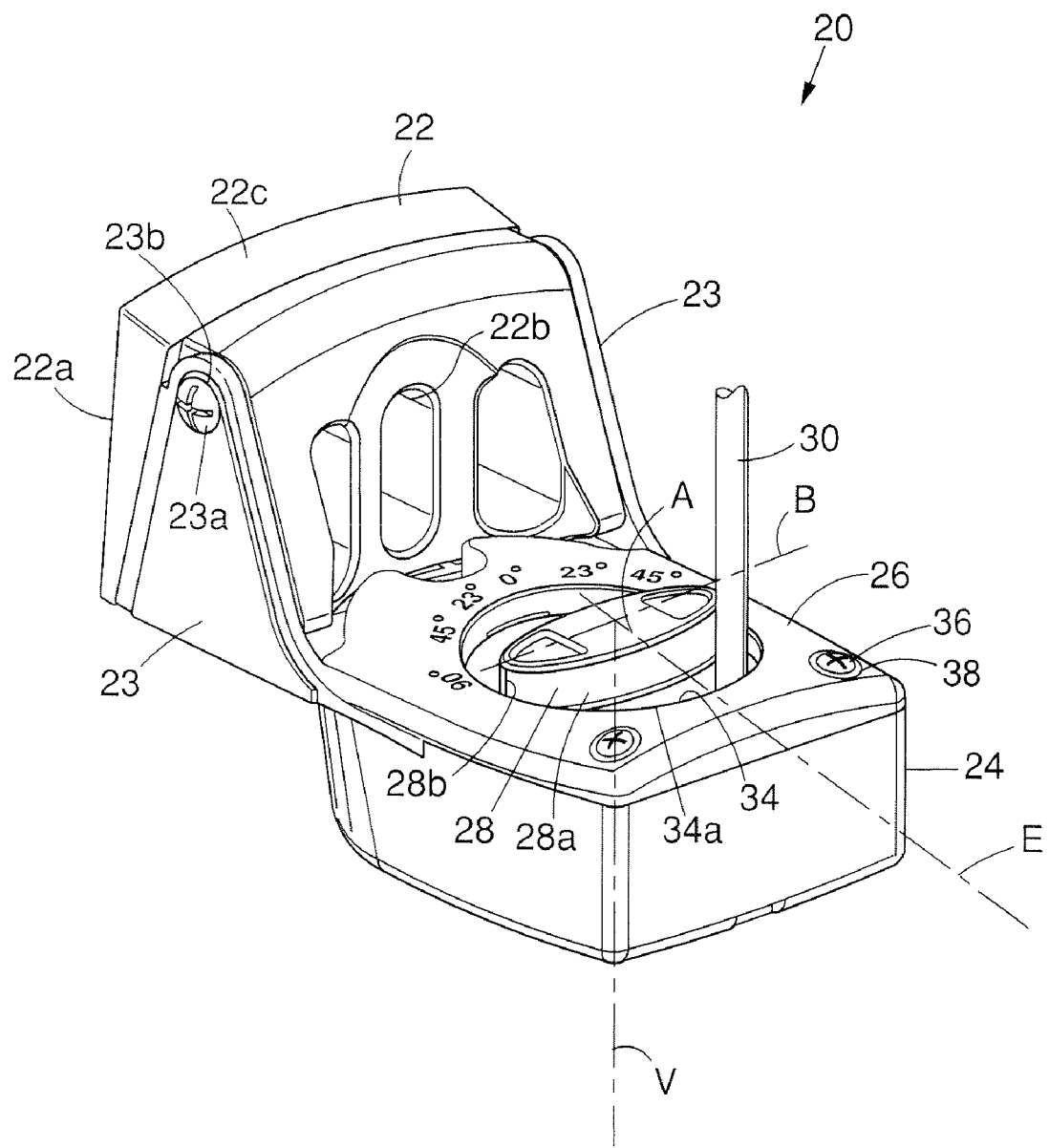
FIG. 5 is a perspective view of an embodiment of a transom mounting transducer assembly in the present invention, with the transducer positioned to generate a fan shaped beam oriented at 90°.
Figure 6:
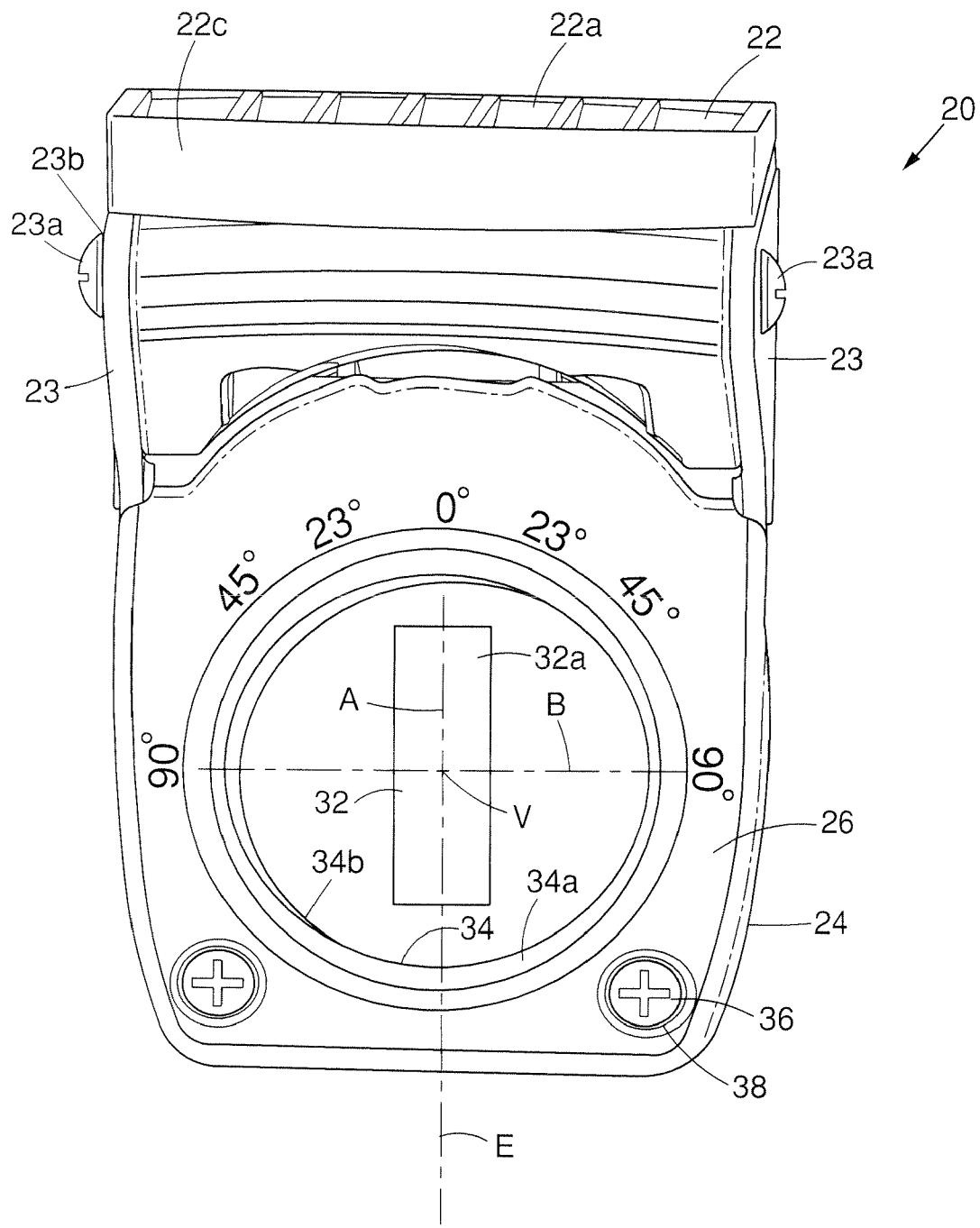
FIG. 6 is a top view of the assembly of FIG. 5 with portions of the transducer removed to show the transducer element.
Figure 7:
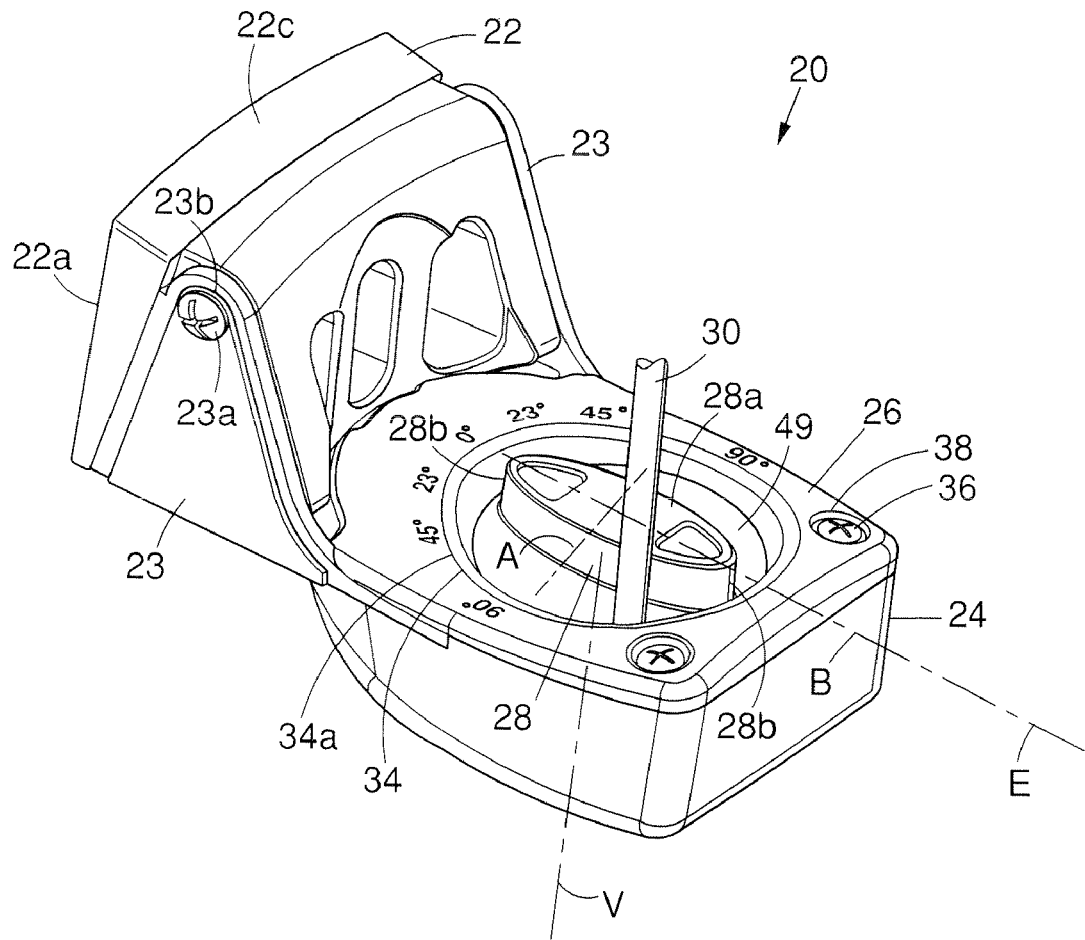
FIG. 7 is a perspective view of the assembly of FIG. 5 with the transducer positioned to generate a fan shaped beam oriented along the direction of travel.
Figure 8:
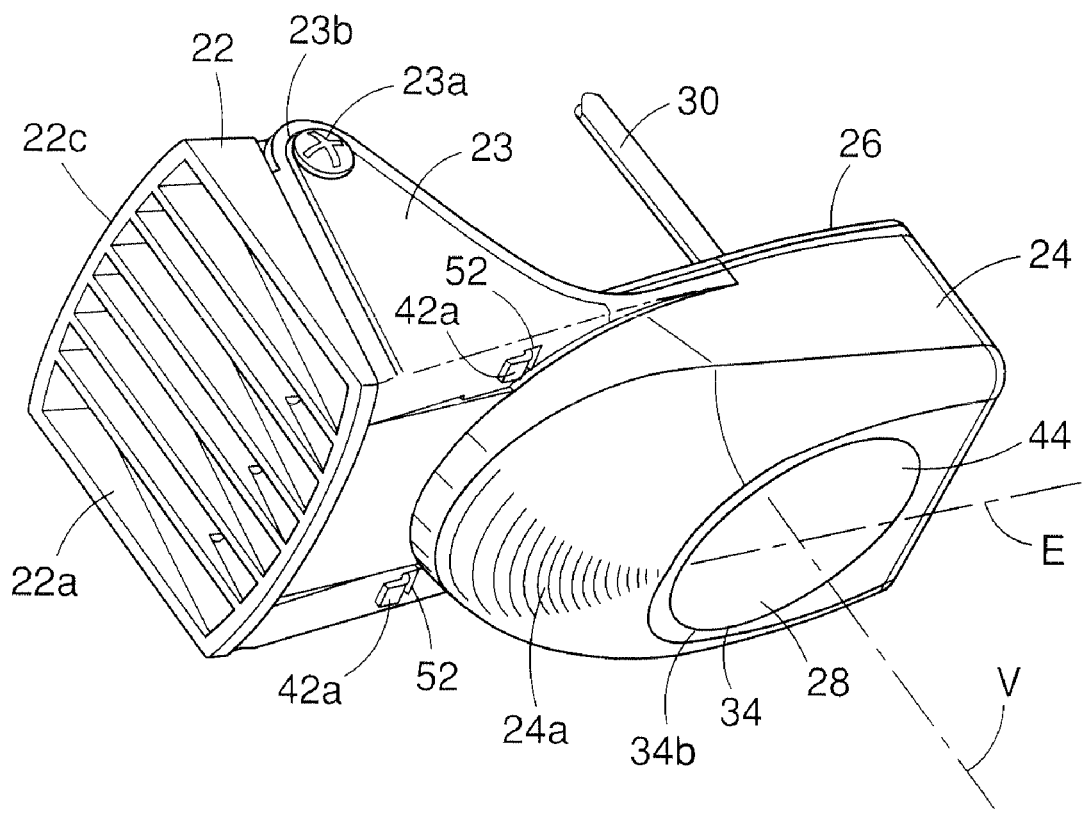
FIG. 8 is a bottom perspective view of the assembly of FIG. 5.

Referring to FIGS. 5-12, transducer assembly 20 is an embodiment of a transom mounted fan beam transducer assembly 14 in the present invention having a quick release adjustment/locking arrangement, feature or mechanism 21, that can be mounted to the transom 12 of a watercraft 10. Transducer assembly 20 can include a housing 24 for containing or housing the transducer 28. The housing 24 can include or be connected to a mounting bracket. The housing 24 can have opposed ears 23 between which a mounting bracket member 22 is pivotably connected about a pivot point 23b, for example, by screws 23a. The mounting portion or surface 22a of the mounting bracket member 22 can be mounted to the transom 12, with fasteners such as screws, through mounting slots 22b. The mounting bracket member 22 can include or employ adjustment wedges or wedge members 22c of desired angles so that the vertical axis V of the transducer 28 can be positioned in the desired orientation, for example, usually directed generally vertically downwardly into the water 8. In some embodiments, some adjustment can also be obtained by pivoting housing 24 about pivot point 23b. The housing 24 can be adjusted so that the bottom 44 of the housing 29 of the transducer 28 is at a slight angle of attack to generate or obtain positive water pressure against the bottom 44, but the transducer 28, and axis V can still be considered to be positioned generally vertically. The housing 24 has a longitudinal housing axis E which can be aligned along the direction of travel axis D and can be considered to be or along the direction of travel axis D. The slots 22b can also allow adjustment of the vertical axis V of the transducer 28 about axis E. The upstream or leading surface 24a of housing 24 can be shaped, for example, rounded as shown, or pointed, for reducing water flow resistance, turbulence and aeration. In addition, the bottom 44 of transducer 28 can be flush with the bottom of housing 24. The transducer 28 can have an indicator or knob structure 28a on the top of the transducer 28 which can provide a schematic representation of the shape and orientation of the fan shaped beam 16 and can be an elongate 3-dimensional elliptical indicator structure. Furthermore, the indicator structure 28a can be grasped as a knob and manipulated by hand for adjustment. A top cover locking member 26 can trap or secure, and rotationally lock the transducer 28 within the housing 24 along a central circular cavity 34. The top cover 26 of the housing 24 can include angle indicator markings to identify the angle at which the indicator structure 28a and the major axis B of the fan shaped beam 16 are oriented relative to housing axis E or direction of travel axis D. The indicator markings can be, for example, 0°, 23°, 45° and 90° on both sides of housing axis E, allowing positioning on either side. Referring to FIG. 5, the transducer 28 is shown with the indicator structure 28a and major axis B oriented at 90° to the E or D axes. Referring to FIG. 7 the indicator structure 28a and major axis B are shown oriented at 0° or along the E or D axes.

The transducer 28 can include a bottom or lower cylindrical housing portion 29 (FIG. 9) with a flat bottom 44, and containing one or more bar shaped piezoelectric or piezoceramic acoustic transducer elements 32 (FIG. 6) oriented to generate the fan shaped beam 16 in a manner corresponding with the indicator structure 28a and along the major axis B. The piezoceramic element 32 can be powered by an electric cable 30 and resonated at about 200 kHz for generating the fan or elliptical shaped acoustic transducer beam 16 downwardly through the bottom 44 of housing 29 along vertical axis V and typically generally vertically downward into the water 8 for finding fish 9 and/or the bottom. The cable 30 can be connected to display 6. The piezoceramic element 32 can be formed, shaped and constructed, acoustically coupled to the bottom 44, and electrically driven, as is known in the art. In some embodiments, an acoustic matching layer 32a with high sound speed such as epoxy or thermoplastic, for example, polyetherimide, can be cast and adhered to element 32 and used to increase the bandwidth of the element 32. Alternatively, other suitable frequencies such as 50 kHz-300 kHz, or dual frequencies can be used, and the beam 16 or beam generation axis V can be angled relative to vertical. In addition, the fan shaped beam 16 can be formed by other suitable methods, for example, with multiple elements, such as bars or discs which can be arranged in an arc; or masking a disc shaped element with acoustic reflecting material such as metal and/or acoustic absorbing material such as cork or foam to the desired shape, such as leaving an unmasked strip along the center.

Figure 9:
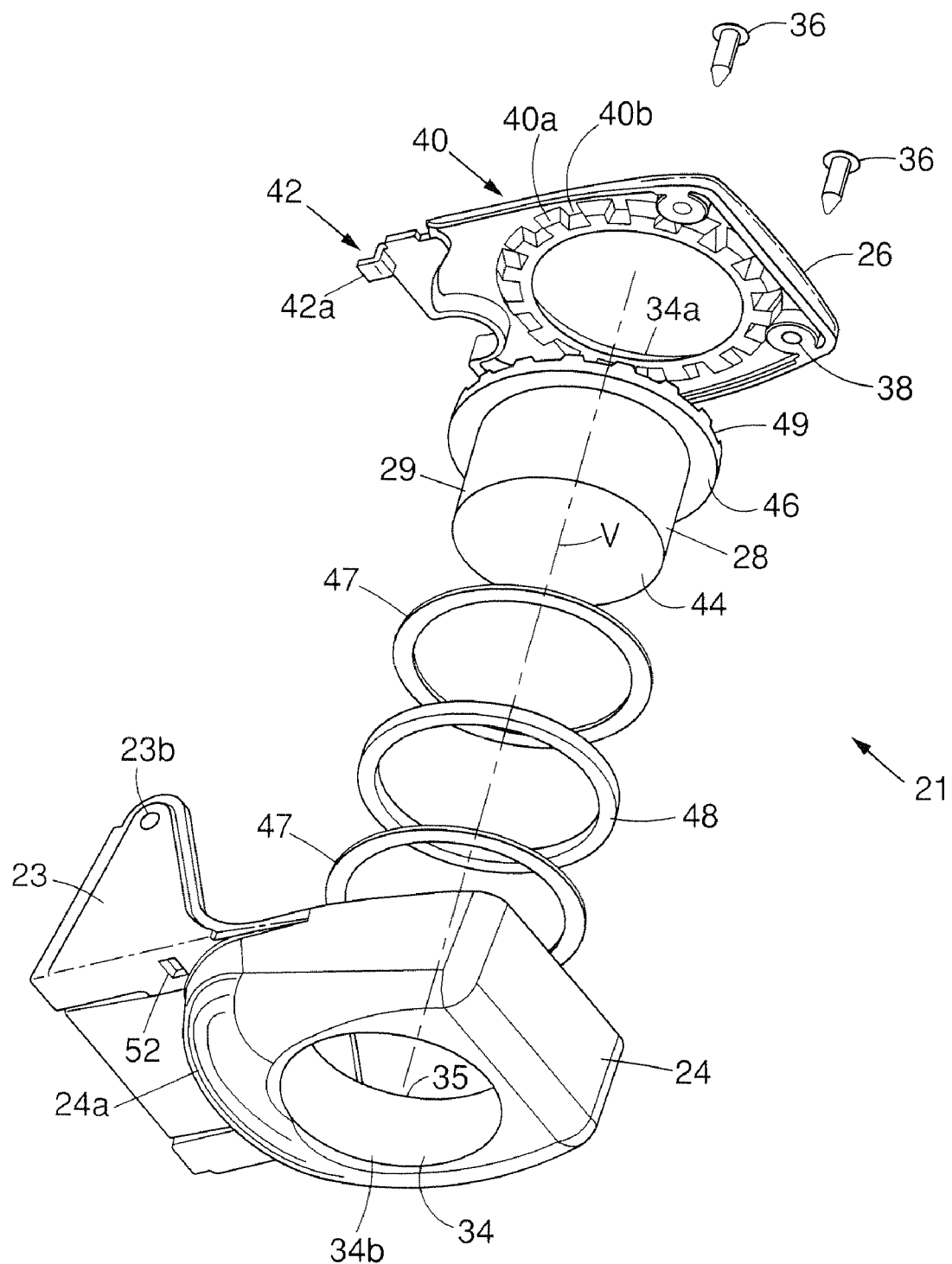
FIGS. 9 and 10 are exploded views of the assembly of FIG. 5.
Figure 10:
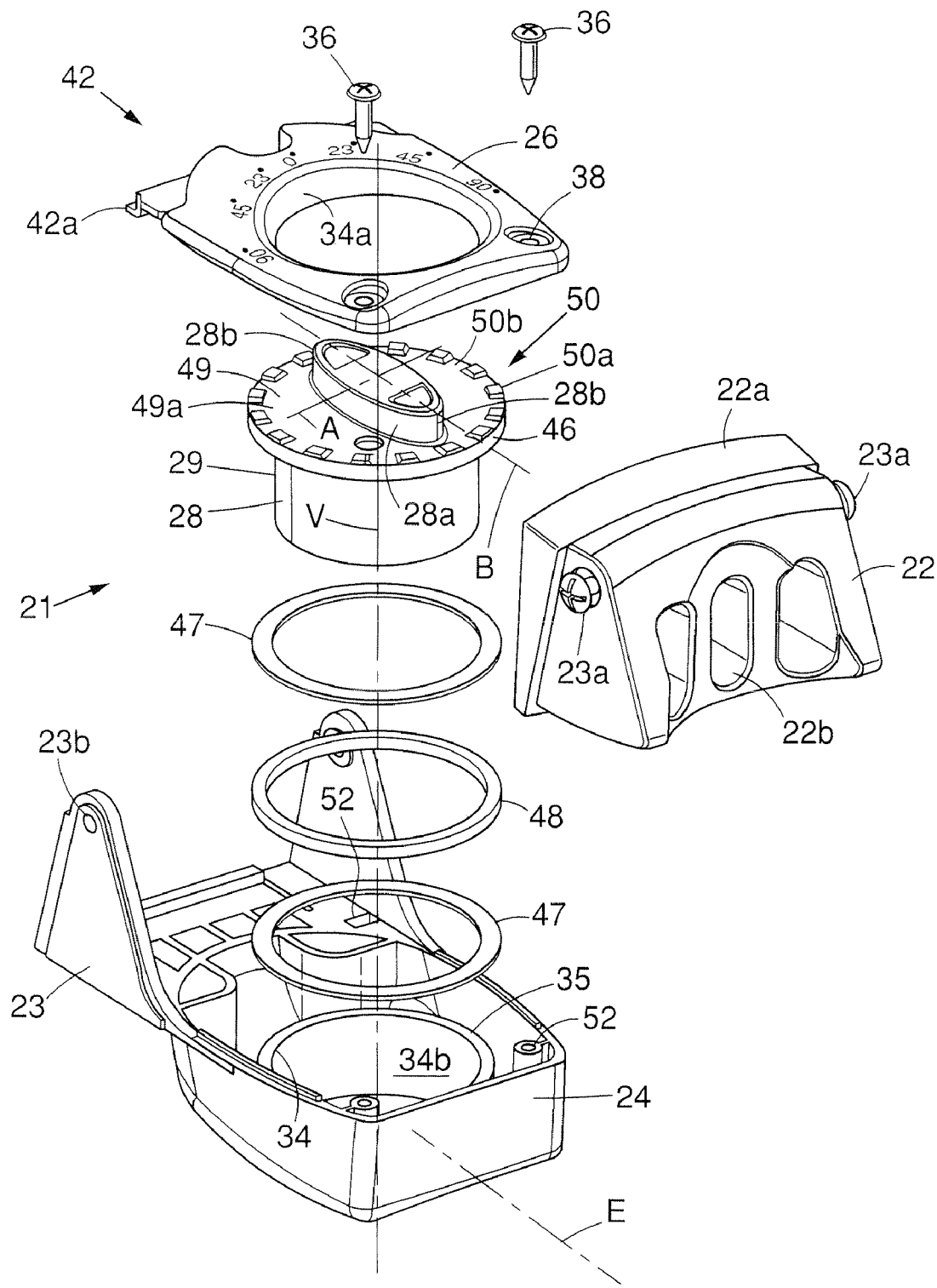
Figure 11:
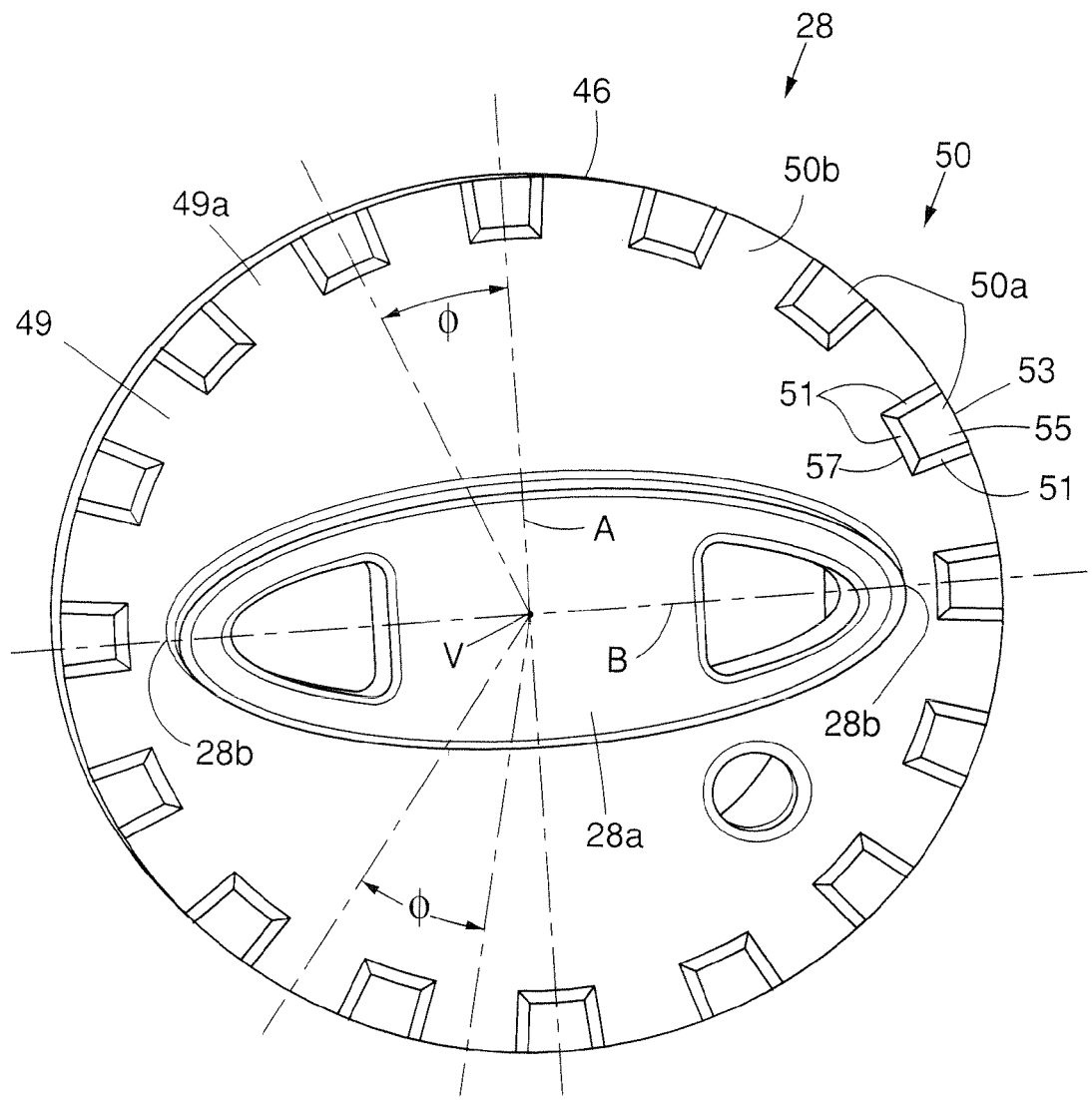
FIG. 11 is a top view of an embodiment of the transducer.

Referring to FIGS. 9-11, the transducer 28 can have a generally flat circular, or disk shaped cap 49 from which the indicator structure 28a extends. The cap 49 can have a larger diameter than the cylindrical housing portion 29, thereby forming an annular shoulder 46. A locking structure 50 can be located on the periphery of the cap 49 on the upper surface 49a. The locking structure 50 can include a ring or circular pattern of spaced apart teeth or protrusions 50a at the periphery of the cap 49 with recesses, spaces, or gaps 50b being between each protrusion 50a. The protrusions 50a can be equally spaced apart from each other by an angle φ. Each protrusion 50a can have a base 57 extending from surface 49a that is generally rectangular in shape with a flat generally rectangular top surface 55 (FIGS. 10 and 11). Three sides 51 of the protrusion 50a can be angled inwardly moving from the base 57 to the top surface 55, for example, on the side edges and the inner side facing inwardly toward vertical axis V. The outer edge 53 can extend vertically on the periphery of the cap 49, and as a result, can have a slight curve corresponding with the outer periphery.

Figure 12:
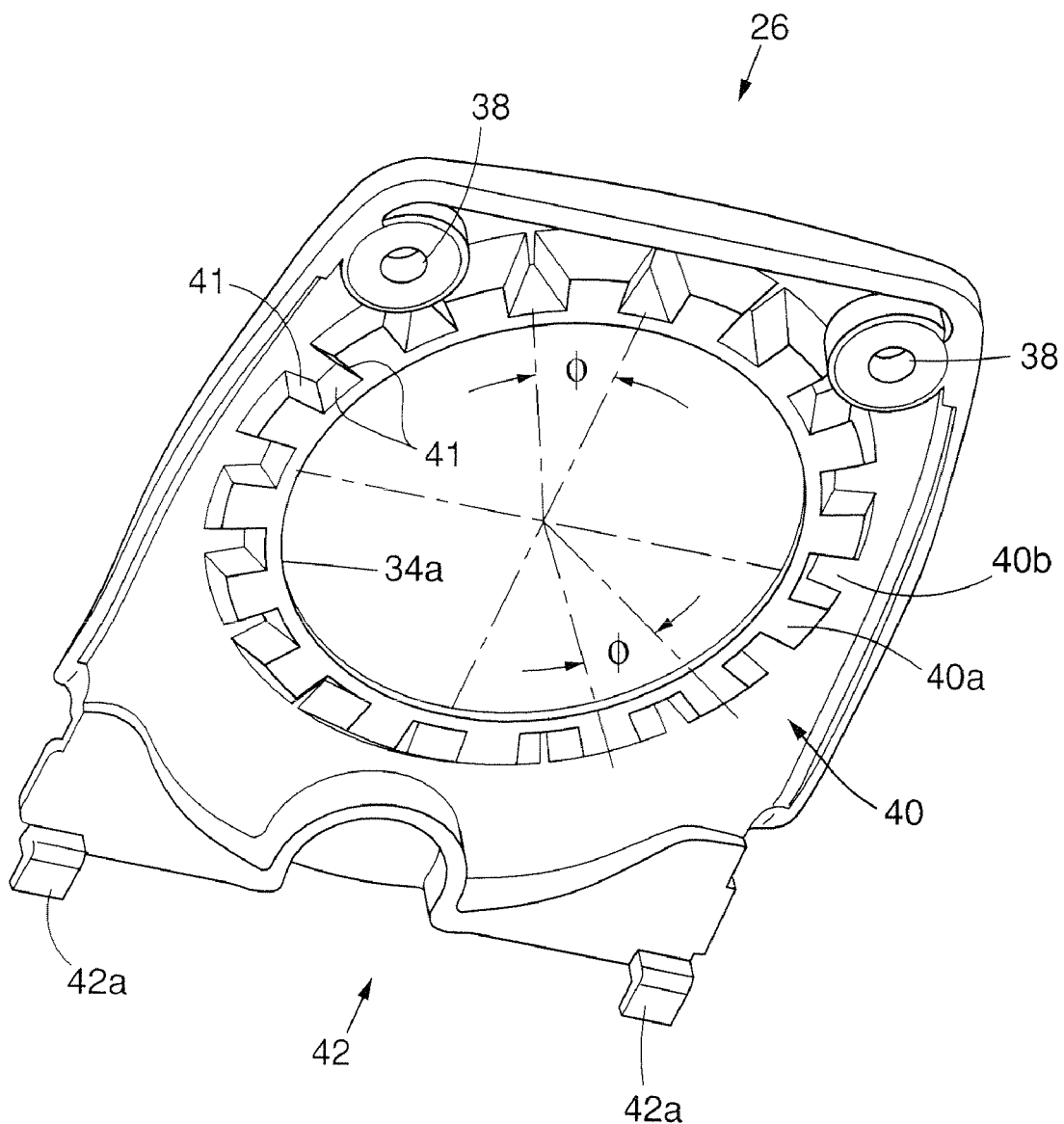
FIG. 12 is a bottom perspective view of an embodiment of the top cover locking member.
Figure 13:
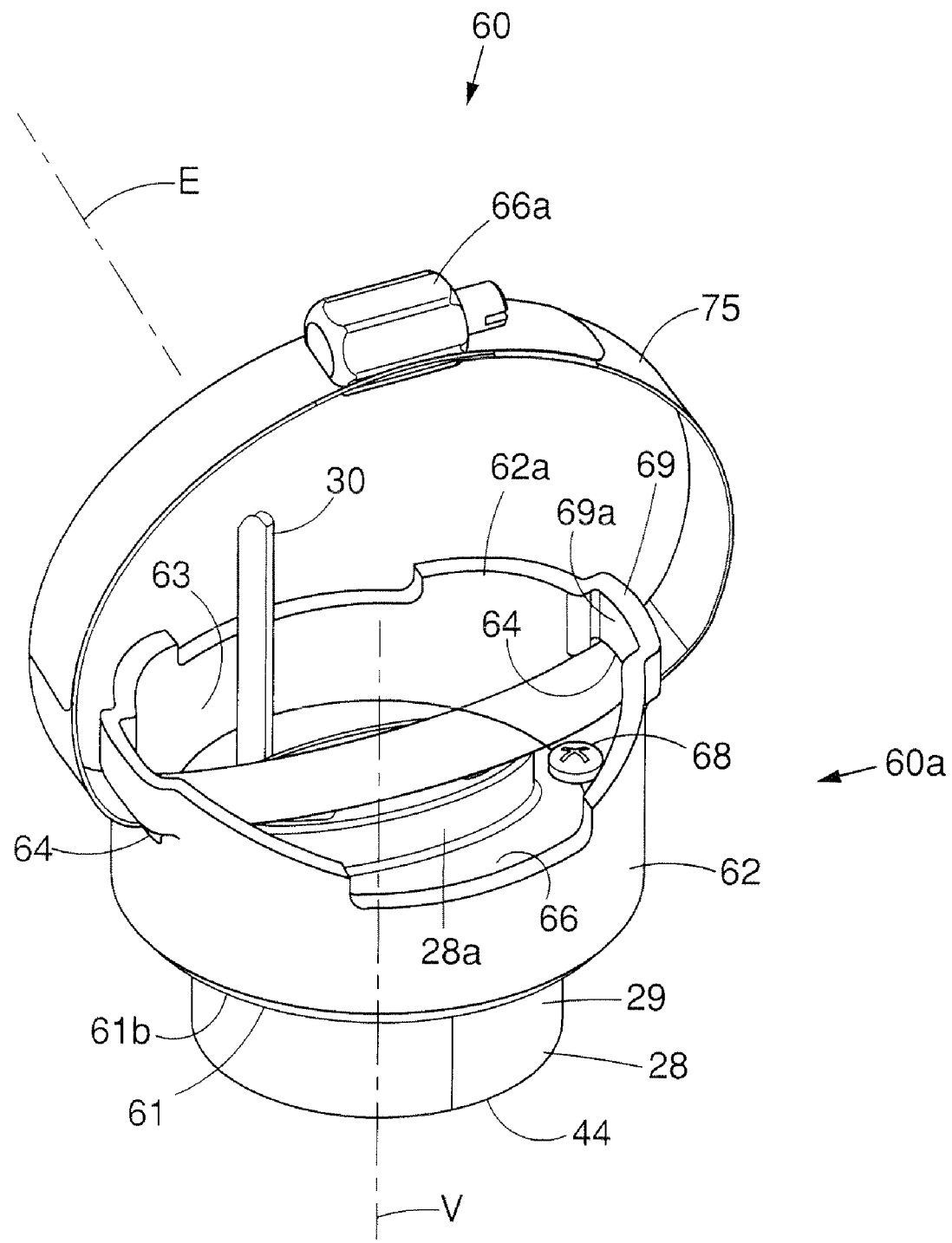
FIG. 13 is a perspective view of an embodiment of a transducer assembly in the present invention for mounting to a trolling motor.
Figure 14:
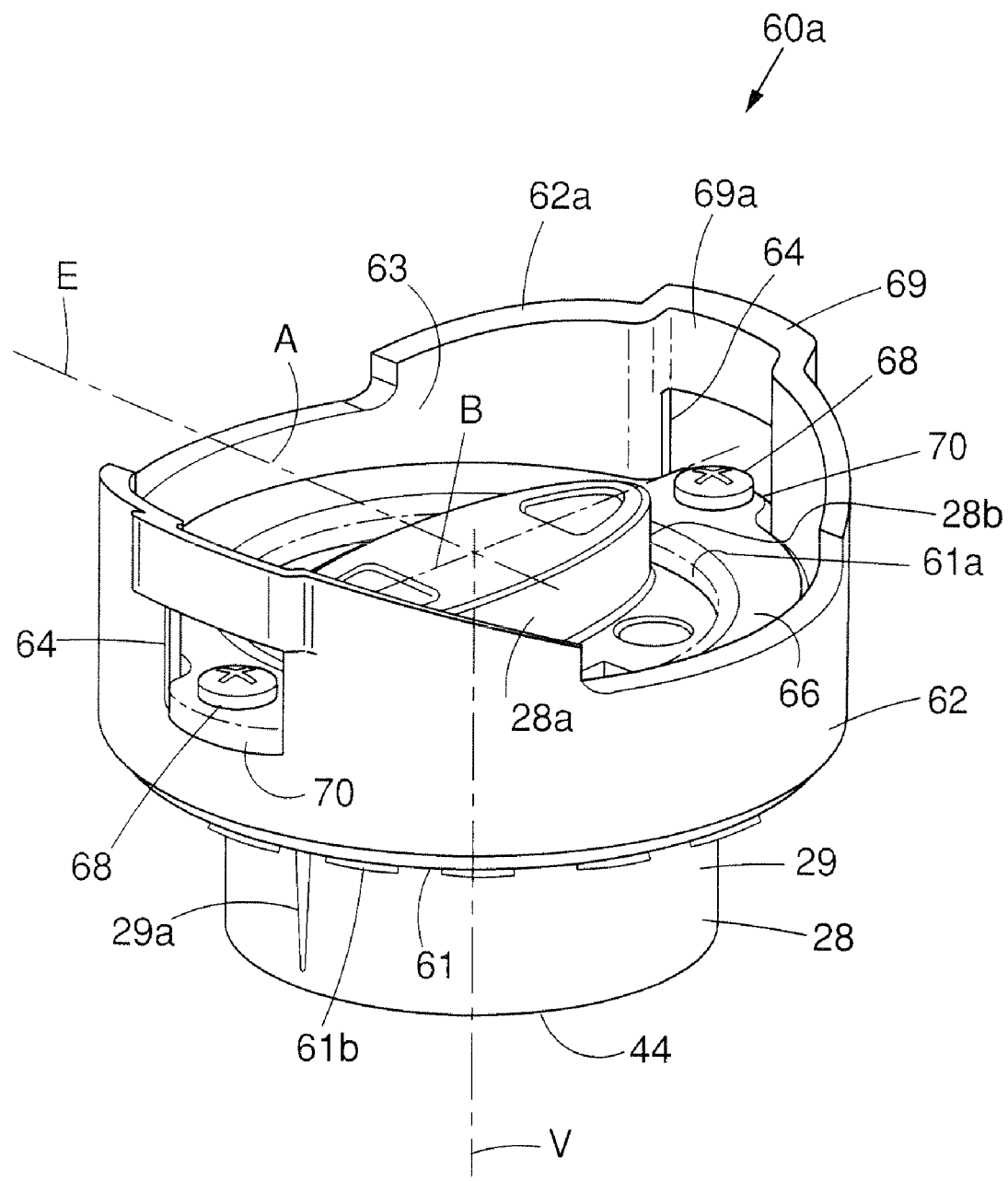
FIG. 14 is a perspective view of the assembly of FIG. 13 with the mounting band removed.
Figure 15:
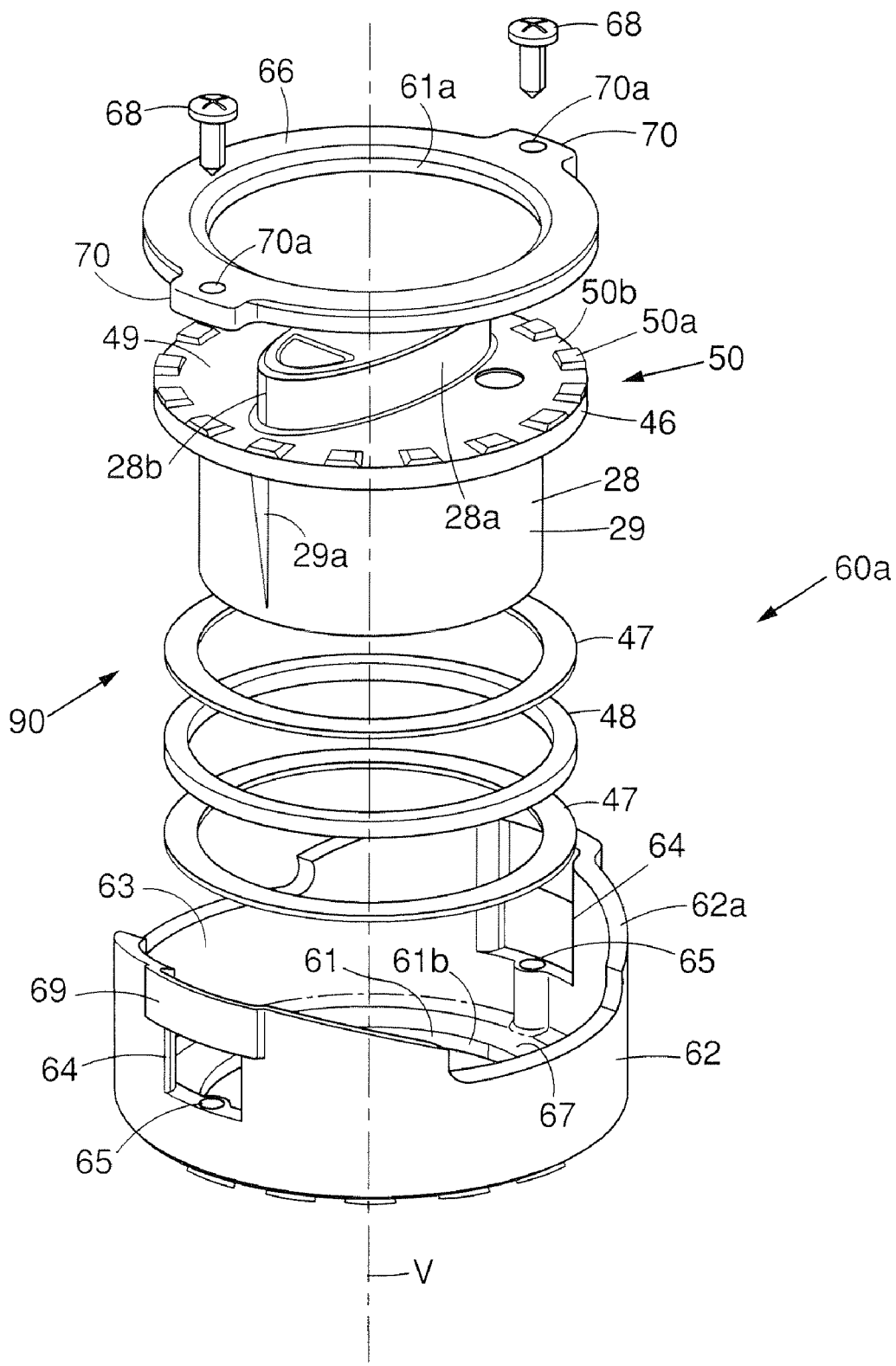
FIGS. 15 and 16 are exploded views of the assembly of FIG. 14.
Figure 16:
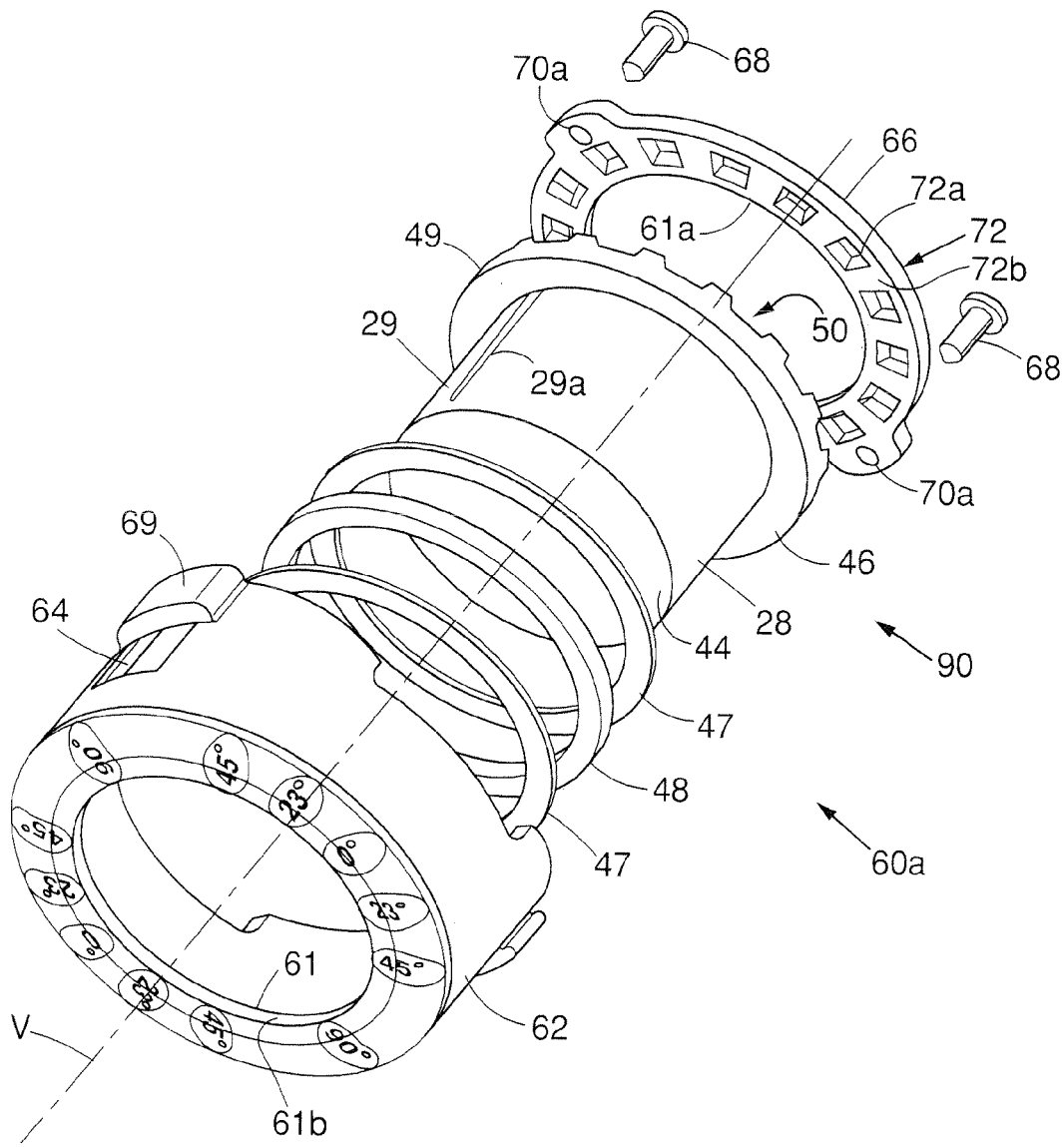
Figure 17:
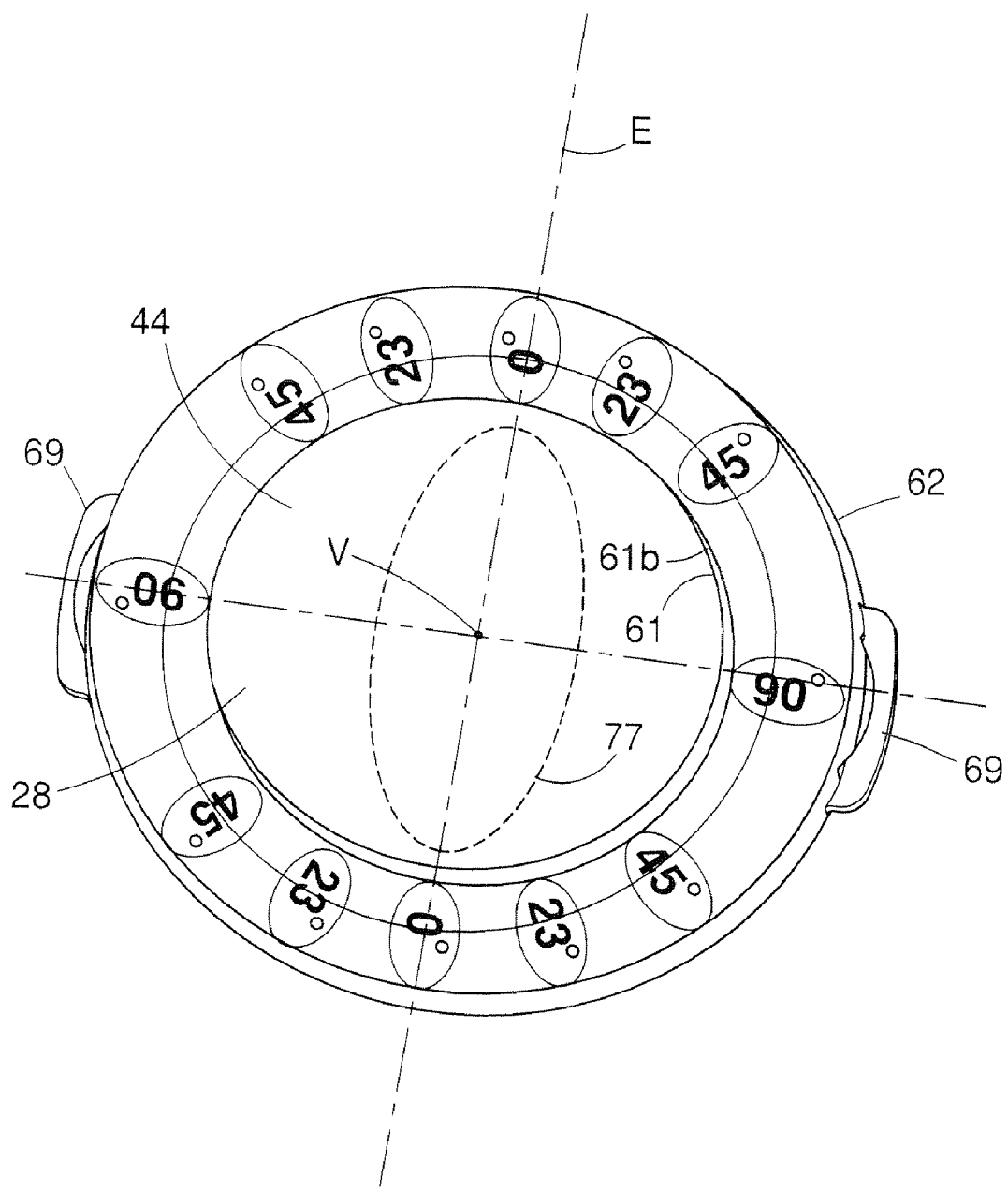
FIG. 17 is a bottom view of the assembly of FIG. 14.
Figure 18:
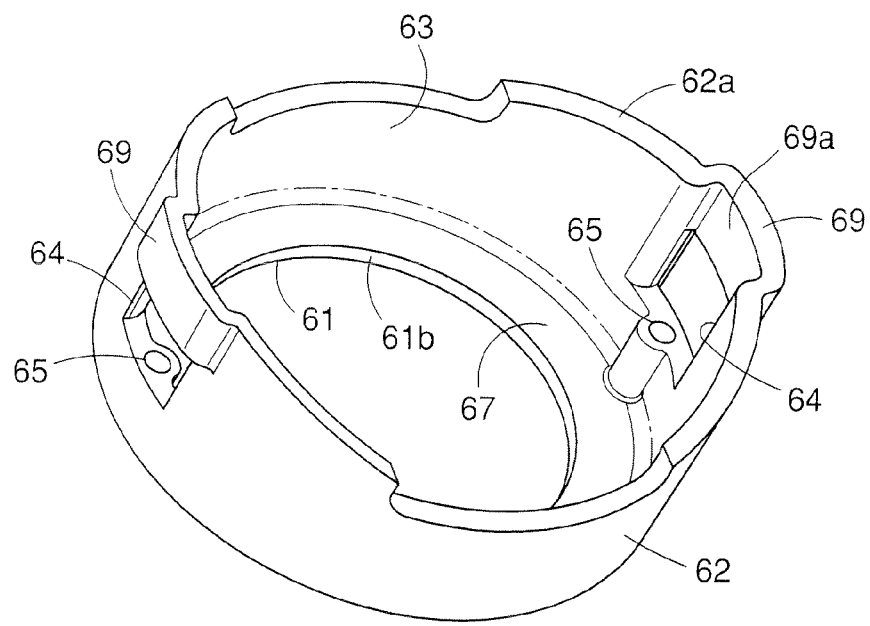
FIG. 18 is a top perspective view of an embodiment of the housing.

Referring to FIG. 12, the top cover 26 can trap and secure transducer 28 in place vertically within housing 24 relative to vertical axis V, and can include a locking structure 40 that mates and engages locking structure 50 of transducer 28 for rotationally locking transducer 28 in position. For securement to the housing 24, the top cover 26 can include a securement structure 42 having two tabs 42a for engaging holes 52 (FIGS. 8 and 9) in housing 24, and can be fastened by two screws 36 through holes 38 in the top cover 26 and into holes 52 within housing 24. The top cover 26 can trap contain or secure the transducer 28 within the opening of a circular, cylindrical or tubular structure 34b extending through housing 24, typically, vertically along the vertical axis V. By trapping the transducer 28 from above with the top cover 26, water pressure against the bottom 44 of the transducer 28 usually does not move the transducer 28 out of position or disengage the locking structures 40 and 50. The tubular structure 34b can serve as a bushing or bearing within which housing portion 29 of transducer 28 can rotate about vertical axis V. A spring member 48, such as an annular wave spring washer, can be positioned between the top annular rim 35 of the tubular structure 34b and the shoulder 46 of transducer 28, for resiliently forcing, springloading or biasing the transducer 28 and locking structure 50 upwardly against the top cover 26, and locking structure 40. The top cover 26 can have a central opening 34a that is smaller than the outer diameter or periphery of the cap 49 and the locking structure 50 of the transducer 28, thereby capturing the top of the transducer 28 while providing visual and physical access to the indicator structure 28a. If desired, the spring member 48 can be sandwiched between two flat annular washers 47. The washers 47 can be used as spacers and/or for wear or bearing purposes against rim 35 and shoulder 46. The washers 47 and spring member 48 can be fitted around the housing 29 of transducer 28. Although the spring member 48 has been described as a wave spring washer, alternatively, the spring member 48 can be other types of suitable springs, for example, cantilever springs, a coil spring, or a bellville spring. In addition, more than one spring can be used.

The locking structure 40 can be located on the bottom of top cover 26 and can encircle opening 34a. The locking structure 40 can include a ring or circular pattern of teeth or protrusions 40a shaped for fitting within or engaging the recesses 50b of locking structure 50 of transducer 28, and recesses 40b shaped for accepting or engaging the protrusions 50a of the locking structure 50. The recesses 40b can have three outwardly angled sides 41 on the sides and radially inward portion, for accepting or engaging the angled sides 51 of protrusions 50a. The recesses 40b can be open on the radial periphery as shown, or alternatively, can be closed with a wall. The protrusions 50a and the mating recesses 40b, or recesses 50b and protrusions 40a, can each be positioned apart from each other by an equal angle φ. In the embodiment shown, there are 16 protrusions 50a and 16 recesses 40b, (or 16 recesses 50b and 16 protrusions 40a), each being positioned 22.5° or about 23° apart from each other, thereby corresponding to the angle markings on top cover 26. In other embodiments, it is understood that less than 16, or more than 16 protrusions 50a and recesses 40b (or recesses 50b and protrusions 40a) can be employed on locking structures 50 and 40 thereby changing the angular increments of adjustment as well as the corresponding angle markings. In addition, the teeth or protrusions 50a and 40a can have other suitable shapes, for example pointed, rounded, curved, angled, etc. and the recesses 50b and 40b can be correspondingly appropriately shaped for example, pointed, rounded, curved, angled, etc. Also, the top cover 26 can have teeth or protrusions that extend into recesses formed within the surface 49a of transducer 28. The housing 24, mounting bracket member 22, top cover 26, and the bottom cylindrical housing portion 29 and cap 49 of the transducer 28, can be made of plastics, composite materials, or metals, or can be a combination thereof.

In use, in order to change the angle of the major axis B of the fan shaped beam 16 relative to the direction of travel axis D or the housing axis E with the quick release adjustment/locking arrangement 21, the user can grasp the indicator structure 28a and press, push or move the transducer 28 downwardly. Pressing the transducer 28 downwardly resiliently deflects or compresses the spring member 48, allowing the top cap 49 of the transducer 28 to move downwardly, thereby vertically disengaging the protrusions 50a and recesses 50b of the locking structure 50 from the mating recesses 40b and protrusions 40a of locking structure 40. Once locking structures 50 and 40 are disengaged, while grasping the indicator or knob structure 28a, the transducer 28 can be rotated or twisted within the tubular structure 34b of housing 24 about axis V until the ends 28b of the indicator structure 28a along the major axis B are aligned with the desired angle marking on the top cover 26. Then by releasing the indicator structure 28a, the spring member 48 can resiliently force or push the transducer 28 and locking structure 50 upwardly and back into engagement with the locking structure 40 of the top cover 26 in the desired angular position, for example, 0°, 23°, 45° or 90° on either side of axis E. Such an adjustment can be made quickly by pushing the transducer 28 downwardly, twisting and releasing.

Referring to FIGS. 13-19, transducer assembly 60 is another embodiment in the present invention having a quick release adjustment/locking arrangement, feature, or mechanism 90, which can be mounted to a motor case or housing of a trolling motor. Transducer assembly 60 includes a housing 62 for rotationally housing or containing transducer 28. The housing 62 can have a generally round or circular periphery. An adjustable locking or mounting band or member 75 can be attached to the housing 62 through opposed openings 64 in opposite side walls of the housing 62 on opposite sides of housing axis E for mounting to the trolling motor. The adjustable locking band 75 can be similar to a hose clamp and can have an adjusting mechanism 66a which can be adjusted with a screwdriver. The housing 62 can have a top surface or rim 62a that is generally cradle shaped for allowing the trolling motor to be tightened and secured against the top surface 62 along housing axis E by the locking band 75. Housing axis E is typically inline or along the direction of travel axis D, and can be considered a direction of travel axis. The transducer 28 can be positioned within a central opening 61 through the interior 63 of housing 62 along vertical or beam generation axis V, with the housing 29 extending through and beyond or below a generally circular opening 61b.

The transducer 28 can be trapped or secured within the housing 62 by a top cover locking member 66. The top cover 66 can be generally ring or annular shaped with a central opening 61a through which the indicator structure 28a can extend. Ears 70 can extend from opposite sides of the top cover 66 and have holes 70a therethrough for allowing the top cover 66 to be secured to the housing 62 with screws 68 extending through the holes 70a and into holes 65 located within openings 64 of housing 62. The cap 49 and locking structure 50 of the transducer 28 can be resiliently biased, forced or spring loaded upwardly into engagement with the locking structure 72 on the bottom or underside of top cover 66 by spring member 48 in a similar manner as in transducer assembly 20. Spring member 48 can be fitted around housing portion 29 and positioned between an annular surface 67 surrounding opening 61b within the interior 63 of the housing 62, and the shoulder 46 of the transducer 28. Washers 47 can be positioned on opposite sides of the spring member 48 and fitted over housing 29.

Figure 19:
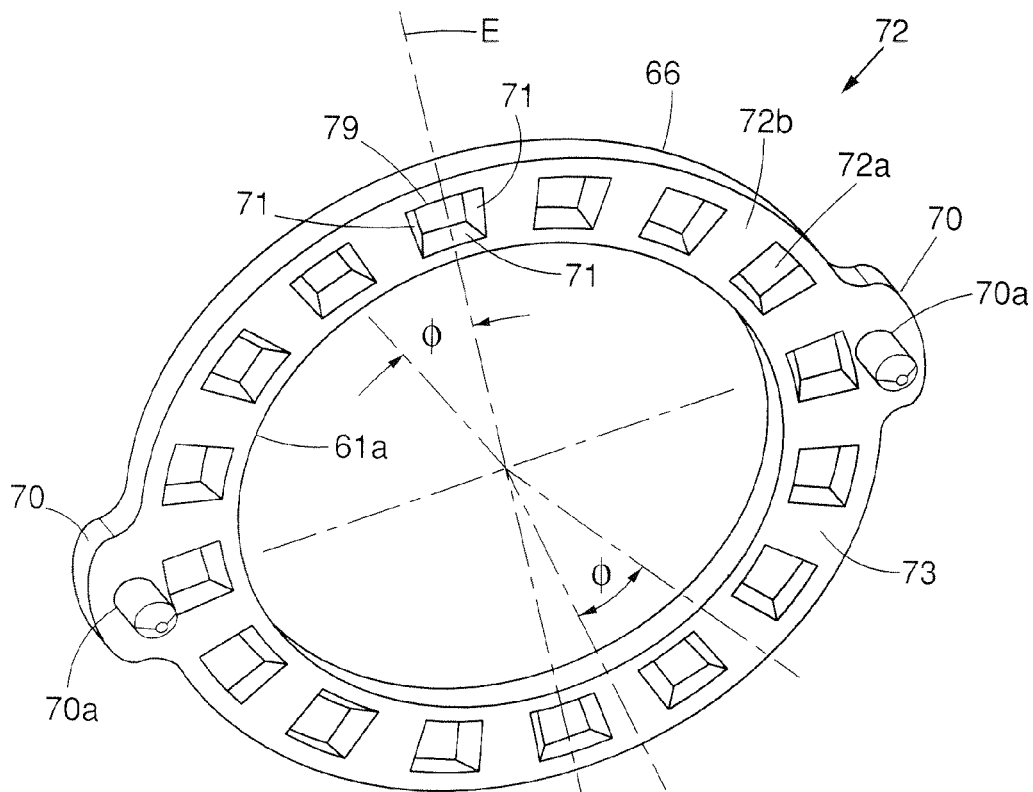
FIG. 19 is a bottom perspective view of an embodiment of the top cover locking member.

Referring to FIG. 19, the locking structure 72 of top cover 66 can include a series of spaced recesses 72a which extend into the bottom surface 73 in a ring shaped or circular pattern for engaging the protrusions 50a of the locking structure 50 on transducer 28. The bottom surface 73 can be generally planar, forming flat surfaces 72b between the recesses 72a. The recesses 72a can be spaced apart by the same angle Φ as the protrusions 50a of the locking structure 50 and can include outwardly angled sides 71 which correspond to the angled sides 51 of protrusions 50a. The outer periphery wall 79 of recesses 72a can be curved to correspond to the outer periphery of protrusions 50a, but alternatively, can be open, similar to locking structure 40.

The bottom of housing 62 (FIGS. 16 and 17) can include angle markings relative to the direction of travel axis D or housing axis E, for indicating the angle of orientation of the indicator structure 28a and the major axis B of the fan shaped beam 16. The side of the housing portion 29 of the transducer 28 can include an indicating marker or line 29a aligned with the major axis B of the fan shaped beam 16 for aligning with the angle markings. The bottom 44 of transducer 28 can also include markings 77 indicating the orientation of the fan shaped beam 16. The top cover 66 can also include angle markings.

In use, to change the orientation or angle of the transducer 28 and the major axis B of the fan shaped beam 16 relative to the direction of travel axis D or the housing axis E with the quick release adjustment/locking arrangement, feature or mechanism 90, the user can grasp the portion of the housing 29 of the transducer 28 extending below or under housing 62 and pull downwardly. Pulling or moving the transducer 28 downwardly resiliently compresses spring member 48, moving the cap 49 and locking structure 50 vertically downwardly out of engagement with locking structure 72 of top cover 66. Once the protrusions 50a of locking structure 50 have disengaged from recesses 77a of top cover 66, the transducer 28 can be rotated about axis V to the desired orientation and then released, whereby the spring member 48 resiliently biases or forces the locking structure 50 upwardly back into engagement with locking structure 72. It is understood that the alternative features discussed with respect to transducer assembly 20 can also be employed with transducer assembly 60.

Figure 20:
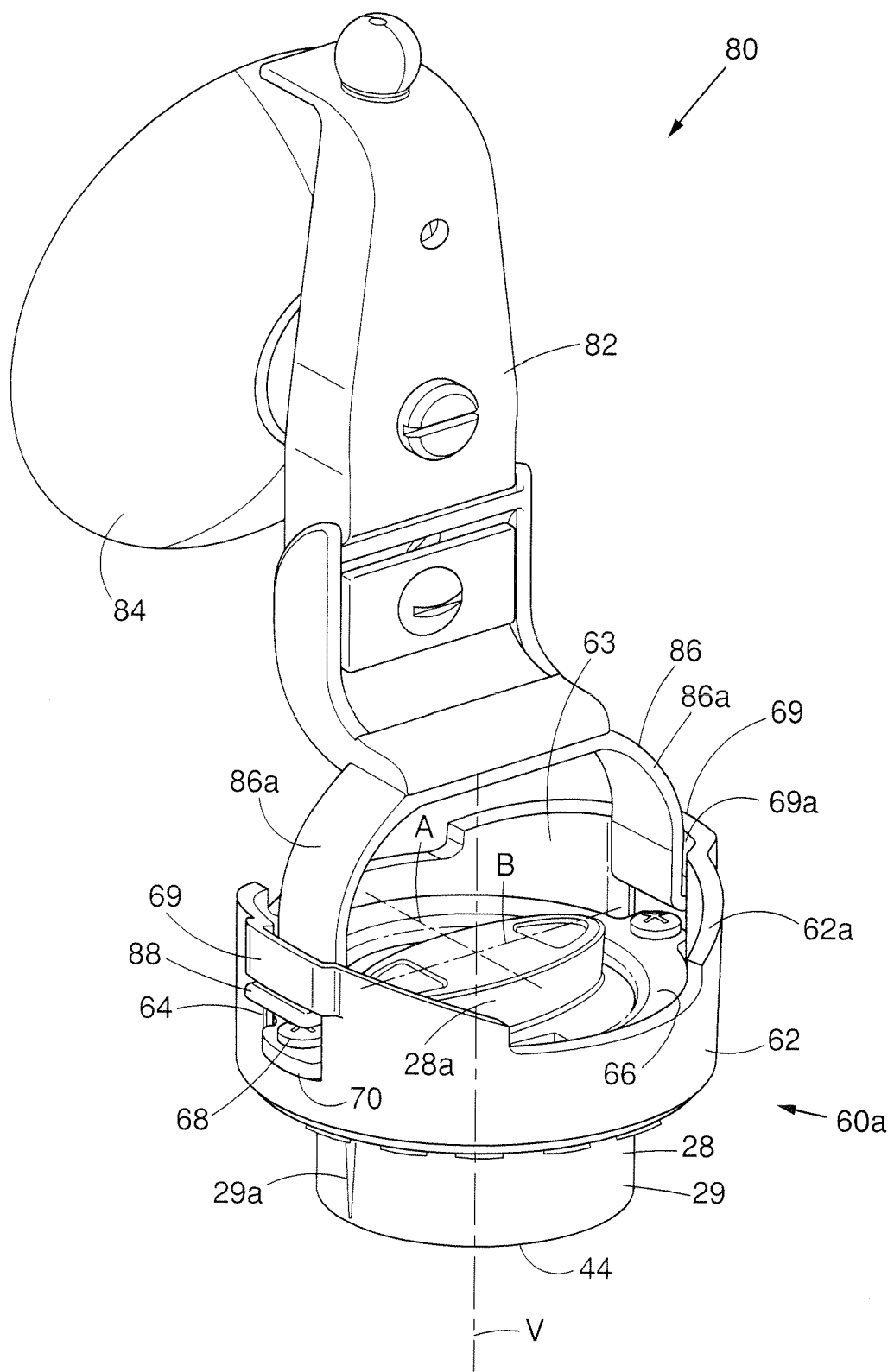
FIGS. 20 and 21 are perspective views of an embodiment of a portable transducer assembly in which the trolling motor transducer assembly of FIG. 14 is mounted to a mounting bracket.
Figure 21:
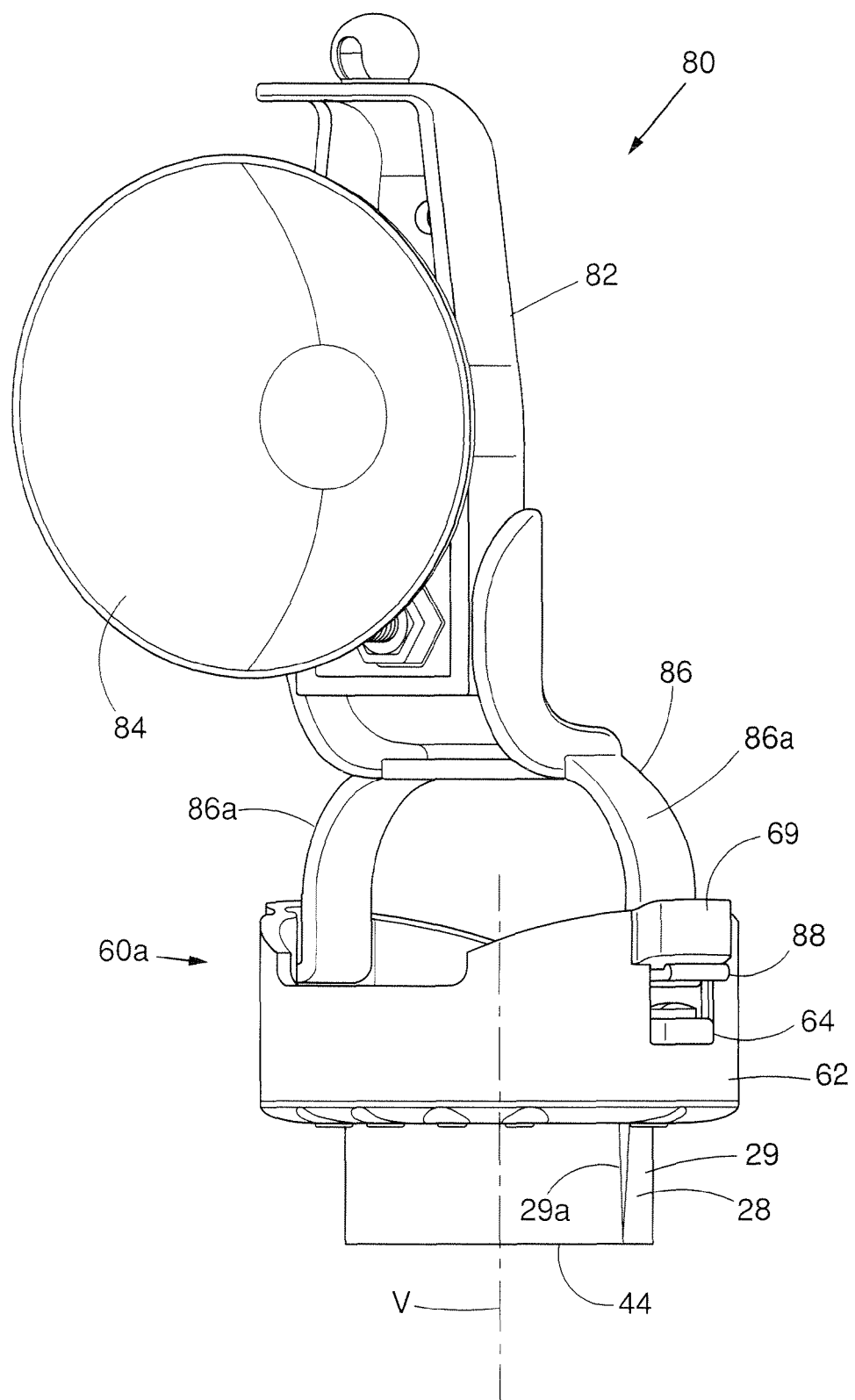

Referring to FIGS. 20 and 21, transducer assembly 80 is a portable fan beam transducer assembly 14 in the present invention, which can be mounted to a number of different desired surfaces, which can include the transom, bow, or sides of a watercraft 10. Transducer assembly 80 can include a mount bracket 82 which is secured to the transducer portion 60a of transducer assembly 60. The mount bracket 82 can include a suction cup 84 for securing to any desired surface, including the transom 12 of a watercraft 10. An adapter 86 having a pair of spaced legs 86a can provide securement to the housing 62 of transducer portion 60a. Each leg 86a can each extend into a vertical recess or groove 69a (FIG. 14) formed on the inside of a cross strap portion 69 extending across the top of opening 64. The legs 86a extend outwardly through the openings 64 and can be secured in place by hooks or feet 88 at the ends of the legs 86a. The angular orientation of transducer 28 and fan beam 16 relative to axes D or E can be adjusted in both of the manners described for transducer assemblies 20 and 60. The components of transducer assemblies 60 and 80 can be made of plastic, composites, metals, or combinations thereof.

Figure 22:
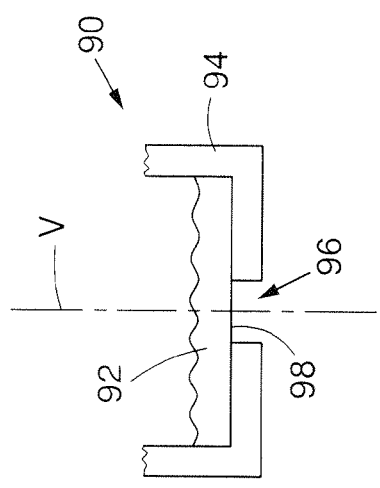
FIG. 22 is a side schematic view of an embodiment of another acoustic transducer generator device for generating a fan shaped beam.
Figure 23:
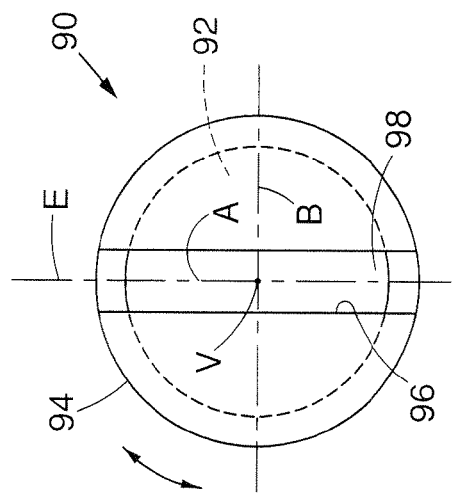
FIG. 23 is a bottom or end schematic view of the acoustic transducer device of FIG. 22.

Referring to FIGS. 22 and 23, acoustic transducer generator device 90 is another embodiment in the present invention for generating a fan or elliptical shaped acoustic transducer beam 16. The transducer 90 can include a piezoelectric or piezocermanic acoustic transducer element 92 for generating an acoustic beam and can be disc shaped. An acoustic mask 94 which can include acoustic reflecting material, such as metal and/or acoustic absorbing material, such as cork, foam, etc., can have an acoustic window, hole or opening 96 across the center, for example, a slot or generally rectangular strip, on the bottom surface 98 of the element 92, through which the fan shaped beam 16 can be generated. If desired, the acoustic opening 96 can have closed longitudinal ends 97. The acoustic opening 96 can be filled with an acoustic transparent or transmissive material, for example, urethane, water, mineral oil, or propylene glycol. In one embodiment, the acoustic mask 94 can be fixed and the transducer 90 can further include locking structure 50 and indicator structure 28a, and can be substituted for transducer 28. In another embodiment, the mask 94 can be rotatable relative to element 92 about axis V, such as shown by the arrows in FIG. 23, such that the mask 94 can be a movable acoustic mask or baffle for changing the angle of the major axis B of the fan shaped beam 16 relative to the direction of travel axis D or the housing axis E. The mask 94 can be an intermediate or outer housing member, can be lockable in desired positions, and can include locking structures similar to those previously described. In some embodiments, multiple acoustic transducer elements can be employed instead of a single element 92.

Figure 23A:
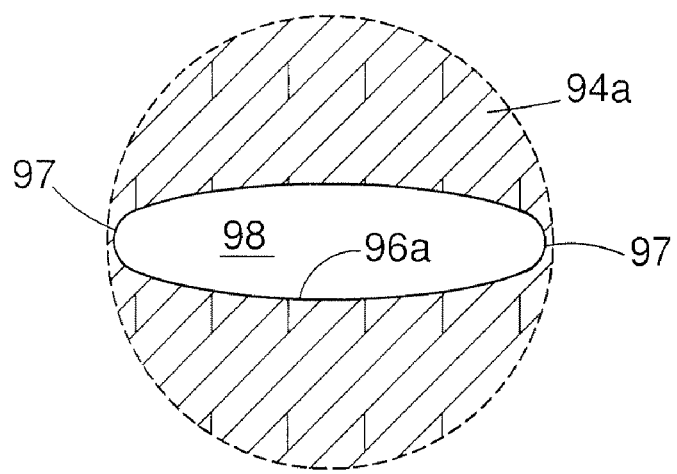
FIGS. 23A-23C are schematic views of elliptical, diamond and curved masking configurations.
Figure 23B:
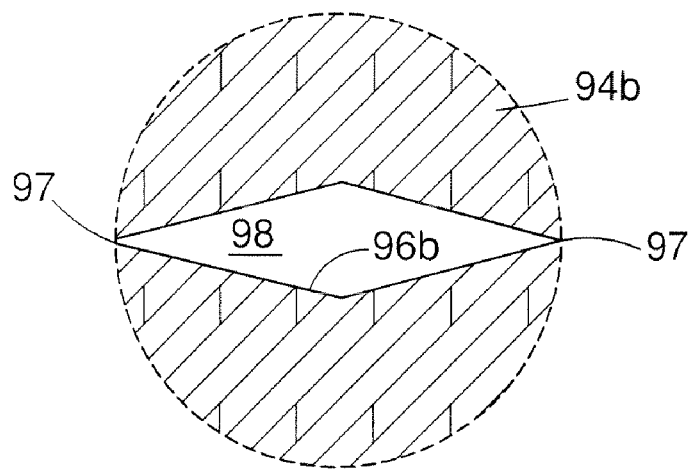
Figure 23C:
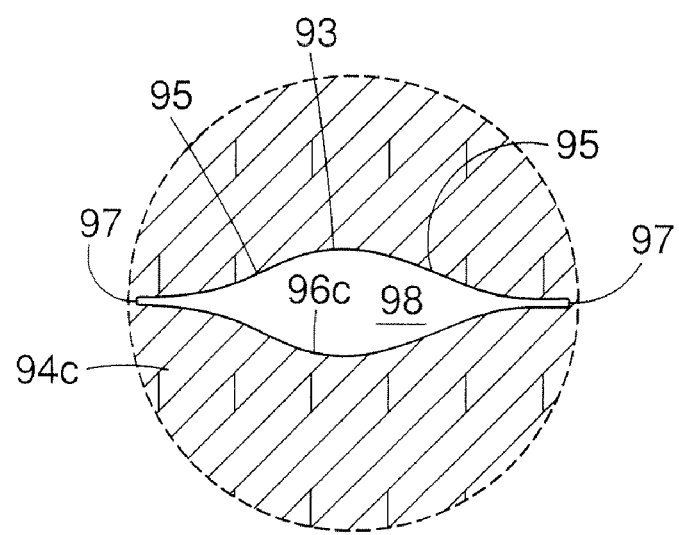

In other embodiments, the acoustic opening 96 can have other suitable shapes. FIG. 23A depicts an example of an acoustic mask 94a having an acoustic window, hole or opening 96a that is elliptical or generally elliptical in shape between longitudinal ends 97. FIG. 23B depicts an example of an acoustic mask 94b having an acoustic window, hole or opening 96b that is generally diamond shaped and can be elongated or flattened between longitudinal ends 97. FIG. 23C depicts an example of a acoustic mask 94c having a curved acoustic window, hole or opening 96c that has an outwardly arched or curved mid section 93 and inwardly arched or curved end sections 95 narrowing to the longitudinal ends 97. The embodiments of FIGS. 23A-23C can result in low side lobes.

Figure 24:
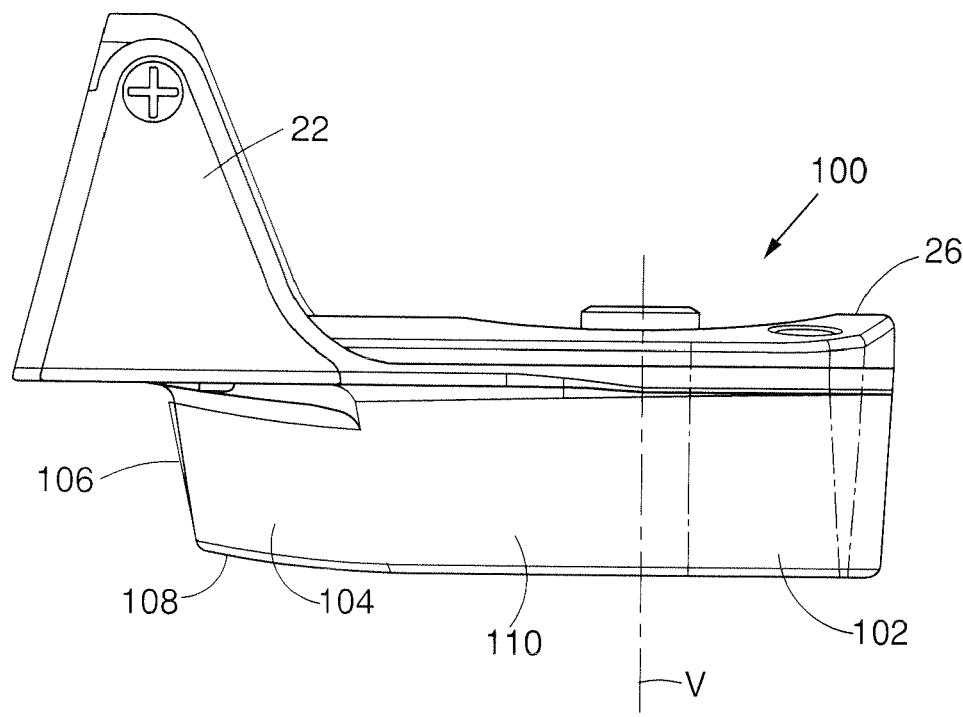
FIG. 24 is a side view of another embodiment of a transom mounting transducer assembly in the present invention.
Figure 25:
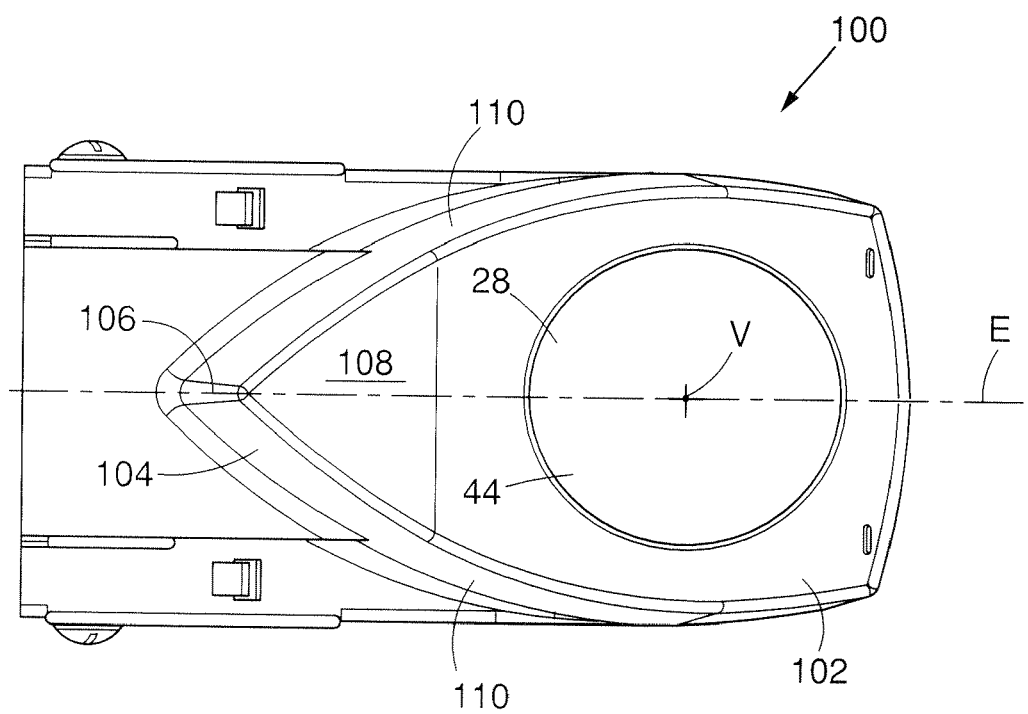
FIG. 25 is a bottom view of the embodiment of FIG. 24.

Referring to FIGS. 24 and 25, transducer assembly 100 is another embodiment of a transom mounted fan beam transducer assembly. Transducer assembly 100 differs from transducer assembly 20 in that transducer assembly 100 has a housing 102 having a leading or upstream portion 104 for reducing water flow resistance, turbulence, or aeration, that narrows to a leading point or edge 106. The side walls 110 can curve inwardly in an arc, and can also angle inwardly, moving in the downward direction away from top cover 26. (FIG. 25). The leading edge 106 can be swept or angled back rearwardly in the down stream direction moving away from the top cover 26 in the downward direction. The bottom of the housing 102 can have a portion 108 that curves or angles slightly upwardly to the leading edge 106. In other embodiments, other suitable pointed designs can be used.

Figure 26:
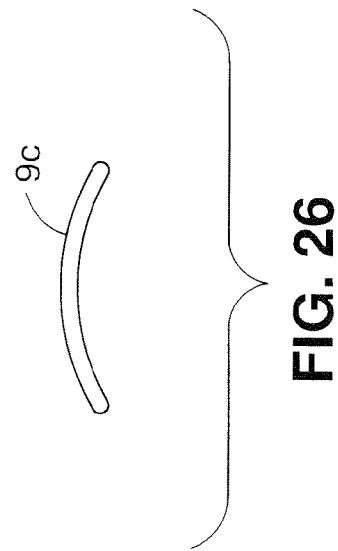
FIG. 26 is a schematic representation of fish images viewed on the display produced by different fan beam orientations relative to the direction of travel axis.

FIG. 26 depicts examples of the appearance of signatures or images 9a-9c of targets, such as fish 9, which can be seen on display 6, for different angular positions of the fan shaped beam 16. When the major axis B of the fan shaped beam 16 is oriented along the housing axis E or the direction of travel axis D, a fish 9 that is within the fan shaped beam 16 can appear on the display 6 as a large arched shaped image 9a. In contrast, when the major axis B of the fan shaped beam 16 is oriented at 90° to the housing axis E or the direction of travel axis D, a fish 9 within the fan shaped beam 16 can appear on the display 6 as a short generally straight image 9b which can be a third or less, of the length or size of image 9a, for the same fish 9. In addition, when the major axis B of the fan shaped beam 16 is oriented at an acute angle θ relative to the housing axis E or the direction of travel axis D, the same fish 9 within the fan shaped beam 16 appear shown on the display 6 as an arched shaped image 9c which is significantly larger and more arched than image 9b, typically if the angle θ is 50° or less. In some instances, when the fan shaped beam 16 is at an angle θ of 23°, the image 9c can be about ⅔ the length of the image 9a, and therefore, provides an image 9c of a fish 9 that is generally similar to the size and shape of the image 9c.

The actual size of image 9c for a given fish 9, can depend upon the angle θ. At angles θ closer to 0° relative the housing axis E or the direction of travel axis D, the image 9c for a given fish 9, is closer to the size and shape of image 9a, and at angles θ moving closer to 90°, the image 9c becomes smaller, and can approach the size and shape of image 9b. It is understood that the size of the images 9a-9c can also depend upon the actual size of the target or fish 9, the speed of the boat and the depth of the fish target.

While this invention has been particularly shown and described with references to example embodiments thereof, it will be understood by those skilled in the art that various changes in form and details may be made therein without departing from the scope of the invention encompassed by the appended claims.

The terms downwardly, upwardly, bottom, vertical, horizontal etc. have been used relative to embodiments and components of transducer assemblies described, and it is understood that in some instances, the assemblies and components can be in other orientations. Although embodiments have been described in which the transducer is moved downwardly for disengagement from the locking structures, in other embodiments, the transducer can be moved upwardly to disengage, or the locking member can be resilient biased against the transducer and moved for disengaging. In some embodiments, non-resilient release/locking arrangements, or conventional arrangements can be employed. Although the above description discusses positioning the fan shaped beam 16 with respect to its major axis B, alternatively, alignment markings and/or indicator structures for aligning the minor axis A can be employed.

What is claimed is:

1. A transducer assembly comprising:
a fan beam transducer having a beam generation axis for generating a fan shaped acoustic beam along the beam generation axis, the fan shaped acoustic beam having a generally elliptical cross sectional shape with a longer major axis and a shorter minor axis across a plane generally perpendicular to the beam generation axis; and
a housing for housing the transducer and having a direction of travel axis, the fan shaped acoustic beam being rotatable relative to the direction of travel axis, the housing having a release locking arrangement for rotationally releasing and locking the position of the fan shaped acoustic beam for orienting at least one of the major axis and minor axis of the fan shaped acoustic beam at a desired position relative to the direction of travel axis.

2. The transducer assembly of claim 1 in which the transducer is rotatable within the housing about the beam generation axis.

3. The transducer assembly of claim 2 in which the locking arrangement is a quick release locking arrangement.

4. The transducer assembly of claim 3 in which the locking arrangement includes a locking member resiliently biased relative to the transducer for releasably locking the transducer.

5. The transducer assembly of claim 4 in which the transducer is resiliently biased upwardly against the locking member by a resilient biasing member, the transducer being resiliently movable downwardly by a hand to disengage from the locking member for allowing rotation, and release of the transducer by the hand allows the resilient biasing member to bias and re-engage the transducer with the locking member in the desired position relative to the direction of travel axis.

6. The transducer assembly of claim 4 in which the transducer and the locking member each have a locking structure which interlock with each other, at least one of the locking structures of the transducer and the locking member has protrusions, and the other recesses, which interlock for locking the transducer in the desired position.

7. The transducer assembly of claim 6 in which the locking structures of the transducer and the locking member are positioned in a circular pattern relative to the beam generation axis, the locking structure of the locking member being positioned above the locking structure of the transducer.

8. The transducer assembly of claim 7 in which the locking structure of the transducer is spring loaded against the locking structure of the locking member by an annular spring.

9. The transducer assembly of claim 8 in which the annular spring is a wave spring washer.

10. The transducer assembly of claim 4 in which the locking member has a central opening through which an upper region of the transducer can be seen, the upper region of the transducer having an indicator of position of the major axis of the fan shaped acoustic beam.

11. The transducer assembly of claim 1 further comprising a mounting bracket for mounting to a watercraft.

12. The transducer assembly of claim 1 further comprising an adjustable mounting band for mounting to a trolling motor.

13. The transducer assembly of claim 1 in which the major axis of the fan shaped acoustic beam is lockable in line with the direction of travel axis, and 90° to the direction of travel axis.

14. The transducer assembly of claim 13 in which the major axis of the fan shaped acoustic beam is lockable at an acute angle relative to the direction of travel axis.

15. The transducer assembly of claim 14 in which the locking member has fixed predetermined locking positions for orienting angular position of the major axis of the fan shaped acoustic beam.

16. The transducer assembly of claim 15 in which the assembly includes angle alignment markings for alignment with the major axis of the fan shaped acoustic beam.

17. The transducer assembly of claim 1 in which the fan beam transducer includes a transducer element and a mask member for generating the fan shaped acoustic beam, the mask member being rotatable relative to the transducer element for rotationally changing the position of the fan shaped acoustic beam.

18. A transducer assembly comprising:
a fan beam transducer having a beam generation axis for generating a fan shaped acoustic beam along the beam generation axis, the fan shaped acoustic beam having a generally elliptical cross sectional shape with a longer major axis and a shorter minor axis across a plane generally perpendicular to the beam generation axis;
a display for displaying images of fish detected by the fan shaped acoustic beam; and
a housing for housing the transducer having a direction of travel axis, the transducer being oriented for generating the fan shaped acoustic beam generally vertically downwardly into water and oriented such that the major axis is at an acute angle relative to the direction of travel axis in the range of about 20° to 50°, such that when the transducer is moving along the direction of travel axis, the fan shaped acoustic beam has a relative width and length with respect to the direction of travel axis that is greater than a distance across the fan shaped acoustic beam along the minor axis that is capable of detecting fish in a relatively wide area of water which remain within the fan shaped acoustic beam long enough to appear on the display as a significant arched shaped image.

19. The transducer assembly of claim 18 in which the housing includes an adjustment mechanism capable of locking the fan beam transducer at a series of predetermined angles.

20. A method of operating a transducer assembly comprising:
with a fan beam transducer having a beam generation axis, generating a fan shaped acoustic beam along the beam generation axis, the fan shaped acoustic beam having a generally elliptical cross sectional shape with a longer major axis and a shorter minor axis across a plane generally perpendicular to the beam generation axis;
housing the transducer within a housing having a direction of travel axis, the fan shaped acoustic beam being rotatable relative to the direction of travel axis; and
rotationally releasing and locking the position of the fan shaped acoustic beam with a locking arrangement for orienting at least one of the major axis and minor axis of the fan shaped acoustic beam at a desired position relative to the direction of travel axis.

21. The method of claim 20 further comprising rotating the transducer within the housing about the beam generation axis.

22. The method of claim 21 further comprising releasing and locking the transducer with a quick release locking arrangement.

23. The method of claim 22 further comprising resiliently biasing a locking member relative to the transducer for releasably locking the transducer.

24. The method of claim 23 further comprising resiliently biasing the transducer upwardly against the locking member with a resilient biasing member, the transducer being resiliently movable downwardly by a hand to disengage from the locking member for allowing rotation, and release of the transducer by the hand allows the resilient biasing member to bias and re-engage the transducer with the locking member in the desired position relative to the direction of travel axis.

25. The method of claim 23 further comprising providing the transducer and the locking member each with a locking structure which interlock with each other, at least one of the locking structures of the transducer and the locking member has protrusions, and the other recesses, which interlock for locking the transducer in the desired position.

26. The method of claim 25 further comprising positioning the locking structures of the transducer and the locking member in a circular pattern relative to the beam generation axis, the locking structure of the locking member being positioned above the locking structure of the transducer.

27. The method of claim 26 further comprising spring loading the locking structure of the transducer against the locking structure of the locking member with an annular spring.

28. The method of claim 27 further comprising spring loading the locking structure of the transducer with a wave spring washer as the annular spring.

29. The method of claim 23 in which the locking member has a central opening through which an upper region of the transducer can be seen, the method further comprising employing an indicator of position of the major axis of the fan shaped acoustic beam on the upper region of the transducer for determining the desired position.

30. The method of claim 20 further comprising mounting the transducer assembly to a watercraft with a mounting bracket.

31. The method of claim 20 further comprising mounting the transducer assembly to a trolling motor with an adjustable mounting band.

32. The method of claim 20 further comprising locking the major axis of the fan shaped acoustic beam into one of, in line with the direction of travel axis, and 90° to the direction of travel axis.

33. The method of claim 20 further comprising locking the major axis of the fan shaped acoustic beam at an acute angle relative to the direction of travel axis.

34. The method of claim 20 further comprising employing fixed predetermined locking positions on the locking member for orienting angular position of the major axis of the fan shaped acoustic beam.

35. The method of claim 34 further comprising aligning angle alignment markings on the assembly with the major axis of the fan shaped acoustic beam.

36. The method of claim 20 further comprising generating the fan shaped acoustic beam with a transducer element and a mask member, the mask member being rotatable relative to the transducer element for rotationally changing the position of the fan shaped acoustic beam.

37. A method of detecting fish in water comprising:
moving a watercraft relative to the water along a direction of travel axis;
mounting a fan beam transducer to the watercraft, the fan beam transducer having a beam generation axis; and
generating a fan shaped acoustic beam along the beam generation axis with the transducer and displaying images of fish detected by the fan shaped acoustic beam on a display, the fan shaped acoustic beam having a generally elliptical cross sectional shape with a longer major axis and a shorter minor axis across a plane generally perpendicular to the beam generation axis, the fan shaped acoustic beam being directed generally vertically downwardly into the water and oriented such that the major axis is at an acute angle relative to the direction of travel axis in the range of about 20° to 50°, such that the fan shaped acoustic beam has a relative width and length with respect to the direction of travel axis that is greater than a distance across the fan shaped acoustic beam along the minor axis to detect fish in a relatively wide area of water which remain within the fan shaped acoustic beam long enough to appear on the display as a significant arched shaped image.

38. The method of claim 37 further comprising housing the fan beam transducer in a housing, the housing having an adjustment mechanism capable of locking the fan beam transducer at a series of predetermined angles.

39. A transducer assembly comprising:
a fan beam transducer having a beam generation axis for generating a fan shaped acoustic beam along the beam generation axis, the fan shaped acoustic beam having a generally elliptical cross sectional shape with a major axis and a minor axis across a plane generally perpendicular to the beam generation axis; and
a housing for housing the transducer and having a direction of travel axis, the fan shaped acoustic beam being rotatable relative to the direction of travel axis, the transducer being rotatable within the housing about the beam generation axis, the housing having a release locking arrangement for rotationally releasing and locking the position of the fan shaped acoustic beam for orienting at least one of the major axis and minor axis of the fan shaped acoustic beam at a desired position relative to the direction of travel axis, the locking arrangement being a quick release locking arrangement, including a locking member resiliently biased relative to the transducer for releasably locking the transducer, the transducer being resiliently biased upwardly against the locking member by a resilient biasing member, the transducer being resiliently movable downwardly by a hand to disengage from the locking member for allowing rotation, and release of the transducer by the hand allows the resilient biasing member to bias and re-engage the transducer with the locking member in the desired position relative to the direction of travel axis.

40. A transducer assembly comprising:
a fan beam transducer having a beam generation axis for generating a fan shaped acoustic beam along the beam generation axis, the fan shaped acoustic beam having a generally elliptical cross sectional shape with a major axis and a minor axis across a plane generally perpendicular to the beam generation axis; and
a housing for housing the transducer and having a direction of travel axis, the fan shaped acoustic beam being rotatable relative to the direction of travel axis, the transducer being rotatable within the housing about the beam generation axis, the housing having a release locking arrangement for rotationally releasing and locking the position of the fan shaped acoustic beam for orienting at least one of the major axis and minor axis of the fan shaped acoustic beam at a desired position relative to the direction of travel axis, the locking arrangement being a quick release locking arrangement, the locking arrangement including a locking member resiliently biased relative to the transducer for releasably locking the transducer, the transducer and the locking member each having a locking structure which interlock with each other, at least one of the locking structures of the transducer and the locking member has protrusions, and the other recesses, which interlock for locking the transducer in the desired position, the locking structures of the transducer and the locking member being positioned in a circular pattern relative to the beam generation axis, the locking structure of the locking member being positioned above the locking structure of the transducer.

41. A transducer assembly comprising:
a fan beam transducer having a beam generation axis for generating a fan shaped acoustic beam along the beam generation axis, the fan shaped acoustic beam having a generally elliptical cross sectional shape with a major axis and a minor axis across a plane generally perpendicular to the beam generation axis;
a housing for housing the transducer and having a direction of travel axis, the fan shaped acoustic beam being rotatable relative to the direction of travel axis, the housing having a release locking arrangement for rotationally releasing and locking the position of the fan shaped acoustic beam for orienting at least one of the major axis and minor axis of the fan shaped acoustic beam at a desired position relative to the direction of travel axis; and
an adjustable mounting band for mounting to a trolling motor.

42. A transducer assembly comprising:
a fan beam transducer having a beam generation axis for generating a fan shaped acoustic beam along the beam generation axis, the fan shaped acoustic beam having a generally elliptical cross sectional shape with a major axis and a minor axis across a plane generally perpendicular to the beam generation axis; and
a housing for housing the transducer and having a direction of travel axis, the fan shaped acoustic beam being rotatable relative to the direction of travel axis, the housing having a release locking arrangement for rotationally releasing and locking the position of the fan shaped acoustic beam for orienting at least one of the major axis and minor axis of the fan shaped acoustic beam at a desired position relative to the direction of travel axis, the fan beam transducer including a transducer element and a mask member for generating the fan shaped acoustic beam, the mask member being rotatable relative to the transducer element for rotationally changing the position of the fan shaped acoustic beam.

43. A method of operating a transducer assembly comprising:
    with a fan beam transducer having a beam generation axis, generating a fan shaped acoustic beam along the beam generation axis, the fan shaped acoustic beam having a generally elliptical cross sectional shape with a major axis and a minor axis across a plane generally perpendicular to the beam generation axis;
    housing the transducer within a housing having a direction of travel axis, the fan shaped acoustic beam being rotatable relative to the direction of travel axis; and
    rotationally releasing and locking the position of the fan shaped acoustic beam with a quick release locking arrangement for orienting at least one of the major axis and minor axis of the fan shaped acoustic beam at a desired position relative to the direction of travel axis, the transducer rotating within the housing about the beam generation axis, a locking member of the locking arrangement being resiliently biased relative to the transducer for releasably locking the transducer, in which the transducer is resiliently biased upwardly against the locking member with a resilient biasing member, the transducer being resiliently movable downwardly by a hand to disengage from the locking member for allowing rotation, and release of the transducer by the hand allows the resilient biasing member to bias and re-engage the transducer with the locking member in the desired position relative to the direction of travel axis.

44. A method of operating a transducer assembly comprising:
    with a fan beam transducer having a beam generation axis, generating a fan shaped acoustic beam along the beam generation axis, the fan shaped acoustic beam having a generally elliptical cross sectional shape with a major axis and a minor axis across a plane generally perpendicular to the beam generation axis;
    housing the transducer within a housing having a direction of travel axis, the fan shaped acoustic beam being rotatable relative to the direction of travel axis; and
    rotationally releasing and locking the position of the fan shaped acoustic beam with a quick release locking arrangement for orienting at least one of the major axis and minor axis of the fan shaped acoustic beam at a desired position relative to the direction of travel axis, the transducer rotating within the housing about the beam generation axis, a locking member of the locking arrangement being resiliently biased relative to the transducer for releasably locking the transducer, the transducer and the locking member each having a locking structure which interlock with each other, at least one of the locking structures of the transducer and the locking member has protrusions, and the other recesses, which interlock for locking the transducer in the desired position, the locking structures of the transducer and the locking member being positioned in a circular pattern relative to the beam generation axis, the locking structure of the locking member being positioned above the locking structure of the transducer.

45. A method of operating a transducer assembly comprising:
    with a fan beam transducer having a beam generation axis, generating a fan shaped acoustic beam along the beam generation axis, the fan shaped acoustic beam having a generally elliptical cross sectional shape with a major axis and a minor axis across a plane generally perpendicular to the beam generation axis;
    housing the transducer within a housing having a direction of travel axis, the fan shaped acoustic beam being rotatable relative to the direction of travel axis;
    rotationally releasing and locking the position of the fan shaped acoustic beam with a locking arrangement for orienting at least one of the major axis and minor axis of the fan shaped acoustic beam at a desired position relative to the direction of travel axis; and
    mounting the transducer assembly to a trolling motor with an adjustable mounting band.

46. A method of operating a transducer assembly comprising:
    with a fan beam transducer having a beam generation axis, generating a fan shaped acoustic beam along the beam generation axis, the fan shaped acoustic beam having a generally elliptical cross sectional shape with a major axis and a minor axis across a plane generally perpendicular to the beam generation axis;
    housing the transducer within a housing having a direction of travel axis, the fan shaped acoustic beam being rotatable relative to the direction of travel axis;
    rotationally releasing and locking the position of the fan shaped acoustic beam with a locking arrangement for orienting at least one of the major axis and minor axis of the fan shaped acoustic beam at a desired position relative to the direction of travel axis; and
    generating the fan shaped acoustic beam with a transducer element and a mask member, the mask member being rotatable relative to the transducer element for rotationally changing the position of the fan shaped acoustic beam.

* * * * *